United States Patent
Kawazu

(10) Patent No.: US 12,301,153 B2
(45) Date of Patent: May 13, 2025

(54) ELECTRIC MOVABLE BODY

(71) Applicant: DENSO CORPORATION, Kariya (JP)

(72) Inventor: Shinsuke Kawazu, Kariya (JP)

(73) Assignee: DENSO CORPORATION, Kariya (JP)

( * ) Notice: Subject to any disclaimer, the term of this patent is extended or adjusted under 35 U.S.C. 154(b) by 203 days.

(21) Appl. No.: 18/156,742

(22) Filed: Jan. 19, 2023

(65) Prior Publication Data

US 2023/0155524 A1 May 18, 2023

Related U.S. Application Data

(63) Continuation of application No. PCT/JP2021/035030, filed on Sep. 24, 2021.

(30) Foreign Application Priority Data

Sep. 29, 2020 (JP) .................................. 2020-164037

(51) Int. Cl.
| | | |
|---|---|---|
| H02P 1/54 | (2006.01) | |
| B60L 3/00 | (2019.01) | |
| B60L 50/60 | (2019.01) | |
| B60L 58/18 | (2019.01) | |
| B64D 27/24 | (2006.01) | |
| B64D 33/08 | (2006.01) | |
| B64F 5/60 | (2017.01) | |
| B64U 50/19 | (2023.01) | |
| H02P 5/50 | (2016.01) | |

(52) U.S. Cl.
CPC .............. *H02P 5/50* (2013.01); *B60L 3/0061* (2013.01); *B60L 50/60* (2019.02); *B60L 58/18* (2019.02); *B64D 27/24* (2013.01); *B64D 33/08* (2013.01); *B64F 5/60* (2017.01); *B64U 50/19* (2023.01); *B60L 2200/10* (2013.01)

(58) Field of Classification Search
CPC ............ H02P 5/50; B60L 58/18; B60L 50/60; B64D 33/08; B64D 27/24
USPC .......................................................... 318/103
See application file for complete search history.

(56) References Cited

U.S. PATENT DOCUMENTS

| | | | |
|---|---|---|---|
| 10,322,824 B1 | 6/2019 | Demont et al. | |
| 11,292,440 B2 * | 4/2022 | Koshiba ................ | B60W 30/06 |
| 2014/0203739 A1 | 7/2014 | Chantriaux et al. | |

(Continued)

FOREIGN PATENT DOCUMENTS

| | | |
|---|---|---|
| DE | 102015226836 A1 | 7/2017 |
| JP | 6696658 B1 | 5/2020 |

OTHER PUBLICATIONS

U.S. Appl. No. 18/156,678, filed Jan. 19, 2023 on behalf of Shinsuke Kawazu et al.

*Primary Examiner* — Erick D Glass
(74) *Attorney, Agent, or Firm* — Oliff PLC

(57) ABSTRACT

An electric movable body includes an output shaft and multiple motors that drive the output shaft. The electric movable body performs a double drive control to assign a drive state to at least two of the motors, performs, when the double drive control is performed and on determination that one of the motors is abnormal, a single drive control to assign the drive state to only one of the motors and to assign a stop state to another of the motors, and identifies, when the single drive control is performed, a drive motor, to which the drive state is assigned and which is abnormal, based on a predetermined state quantity correlated with a drive state of the drive motor.

13 Claims, 11 Drawing Sheets

(56) References Cited

U.S. PATENT DOCUMENTS

| | | |
|---|---|---|
| 2016/0236790 A1 | 8/2016 | Knapp et al. |
| 2017/0190435 A1 | 7/2017 | Kobayashi et al. |
| 2018/0134400 A1 | 5/2018 | Knapp et al. |
| 2020/0047895 A1 | 2/2020 | Roberge |
| 2020/0346769 A1 | 11/2020 | Knapp et al. |
| 2022/0219827 A1 | 7/2022 | Knapp et al. |
| 2022/0388487 A1* | 12/2022 | Hwang .................... B60T 7/12 |

* cited by examiner

US 12,301,153 B2

ELECTRIC MOVABLE BODY

CROSS REFERENCE TO RELATED APPLICATION

The present application is a continuation application of International Patent Application No. PCT/JP2021/035030 filed on Sep. 24, 2021, which designated the U.S. and claims the benefit of priority from Japanese Patent Application No. 2020-164037 filed on Sep. 29, 2020. The entire disclosures of all of the above applications are incorporated herein by reference.

TECHNICAL FIELD

The present disclosure relates to an electric movable body.

BACKGROUND

Conventionally, an electric aircraft (electric movable body) includes a plurality of motors.

SUMMARY

According to a first aspect of the present disclosure, an electric movable body includes an output shaft and a plurality of motors configured to drive the output shaft.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
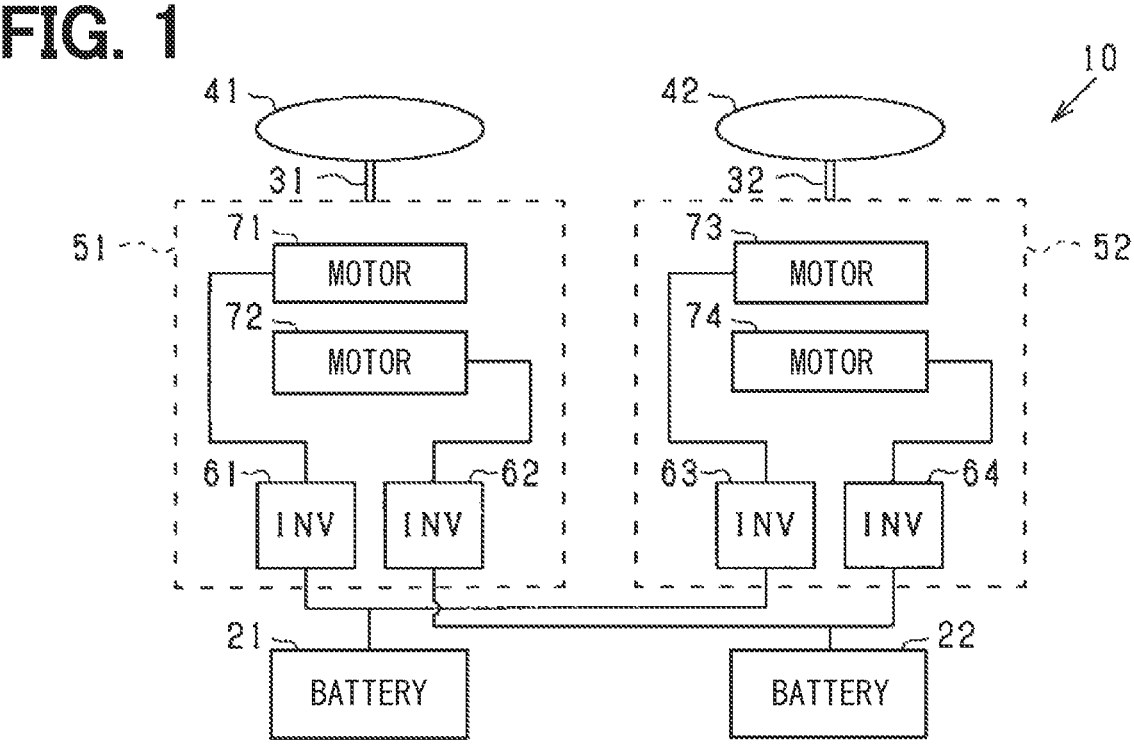
FIG. 1 is a schematic diagram of an electric aircraft according to a first embodiment.

Hereinafter, examples of the present disclosure will be described.

According to an example of the resent disclosure, an electric aircraft (electric movable body) includes a plurality of motors.

When the plurality of motors are in a driven state, even when abnormality is detected in one of the motors, the abnormal motor may not be identified.

According to a first example to address the above-mentioned issue, an electric movable body includes an output shaft and a plurality of motors configured to drive the output shaft. The electric movable body comprises: a double drive control unit configured to perform a double drive control to assign a drive state to at least two of the motors; a single drive control unit configured to, when the double drive control unit performs the double drive control and on determination that one of the motors is abnormal, perform a single drive control to assign the drive state to only one of the motors and to assign a stop state to an other of the motors; and an abnormality determination unit configured to, when the single drive control unit performs the single drive control, identify a drive motor, to which the drive state is assigned and which is abnormal, based on a predetermined state quantity correlated with a drive state of the drive motor.

According to the above configuration, the electric movable body includes the output shaft and the plurality of motors configured to drive the output shaft. Therefore, even in a case where an abnormality occurs in one of the motors that drive the output shaft, the other of the motors is capable of driving the output shaft.

The double drive control unit is configured to perform the double drive control to assign the drive state to at least two of the motors. The configuration performs the double drive control, thereby to enable to enhance an output performance of the electric movable body compared with a configuration in which the drive state is assigned to only one of the motors.

Herein, in a configuration, in which, for example, a plurality of motors are directly connected to the output shaft, the rotational speed of the plurality of motors (predetermined state quantity correlated with the drive state of the drive motor) becomes the same. In this case, when the double drive control is performed, and even when one of the motors is determined to be abnormal, the motor, which is abnormal, cannot be identified based on the predetermined state quantity of the motors.

In this respect, the single drive control unit is configured to, when the double drive control unit performs the double drive control and on determination that one of the motors is abnormal, perform the single drive control to assign the drive state to only one of the motors and to assign the stop state to the other of the motors. The abnormality determination unit is configured to, when the single drive control unit performs the single drive control, identify the motor, to which the drive state is assigned and which is abnormal, based on the predetermined state quantity correlated with the drive state of the drive motor. In this way, the configuration enables to change from the state, in which the drive state of the plurality of motors affect the predetermined state quantity, into the state, in which the drive state of only one motor affects the predetermined state quantity. Therefore, in the electric movable body including the plurality of motors that drive the output shaft, the configuration facilitates to identify the abnormal motor, even when the plurality of motors are driven.

In the single drive control, when the motor, to which the drive state is assigned, is normal, and when the motor, to which the stop state is assigned, includes the abnormal motor, the abnormality determination unit cannot identify the abnormal motor.

In this respect, according to a second example, the single drive control unit is configured to, when the abnormality determination unit cannot identify the drive motor, which is abnormal, assign the drive state to, from among the motors, only one of the motors, which is other than the one of the motors to which the drive state is assigned in the single drive control at a previous time or before, assign the stop state to the other motor, and perform the single drive control again. Therefore, even when the motor, to which the drive state is assigned in the single drive control at the previous time or before, is normal, the drive state is assigned to only one motor, which is other than the motor, to which the drive state is assigned in the single drive control at the previous time or before, and the identification of the abnormal motor in the single drive control by the abnormality determination unit can be performed again. Therefore, the configuration enables to facilitate to identify the abnormal motor.

According to a third example, when the abnormality determination unit identifies the abnormal drive motor, and when the motors include a motor, which is normal, the drive motor, which is identified to be abnormal, is switched into the stop state, and at least one of the motors, which is normal, is switched into the drive state. This configuration enables to switch the drive motor, which is identified to be abnormal, into the stop state, and to cause the normal motor to continue to drive the output shaft.

According to a fourth example, a clutch configured to switch between a state, in which a torque is transmitted from the motor to the output shaft, and a state, in which the torque is not transmittable, is further included. the abnormality determination unit is configured to, when the single drive control unit performs the single drive control, cause the clutch to switch into the state, in which the torque is not transmittable from the stopped motor, to which the stop state is assigned, to the output shaft, and change the stopped motor into the drive state, and determine an abnormality of the stopped motor, based on the predetermined state quantity correlated with the drive state of the stopped motor.

According to the above configuration, the electric movable body includes the clutch configured to switch between the state, in which the torque is transmitted from the motor to the output shaft, and the state, in which the torque is not transmittable. Therefore, the clutch is caused to switch into the state in which the torque is not transmittable from the motor, to which the stop state is assigned, to the output shaft, thereby to enable to suppress transmission of a braking torque or the like from the stopped motor to the output shaft.

Further, the abnormality determination unit is configured, when the single drive control unit performs the single drive control, cause the clutch to switch into the state, in which the torque is not transmittable from the stopped motor, to which the stop state is assigned, to the output shaft, and change the stopped motor into the drive state, and determine an abnormality of the stopped motor, based on the predetermined state quantity correlated with the drive state of the stopped motor. In this way, the clutch is caused to switch into the state in which the torque is not transmittable from the stopped motor to the output shaft, thereby to enable to determine an abnormality of the stopped motor at arbitrary timing without change in the output of the output shaft. Therefore, the configuration enables to quickly determine an abnormality of not only the drive motor but also the stopped motor.

According to a fifth example, the clutch is a one-way clutch configured to permit transmission of the torque from the motor to the output shaft and prohibit transmission of a torque from the output shaft to the motor. The abnormality determination unit is configured to, when the single drive control unit performs the single drive control, change the stopped motor into the drive state in which a rotation direction is in a direction opposite to a rotation direction of the drive motor to which the drive state is assigned, and determine an abnormality of the stopped motor based on the predetermined state quantity of the stopped motor.

According to the configuration, the clutch is the one-way clutch configured to permit transmission of the torque from the motor to the output shaft and prohibit transmission of a torque from the output shaft to the motor. The one way clutch is configured to, when the motor is in the drive state, switch into the state in which the torque is transmitted from the motor to the output shaft. Further, the one-way clutch is configured to, when the motor is stopped or driven in the opposite direction, switch into the state in which the torque is not transmittable from the output shaft to the motor, that is, the state in which a negative torque is not transmittable from the motor to the output shaft. Therefore, the one-way clutch is caused to switch into the state in which the torque is not transmittable from the motor, to which the stop state is assigned, to the output shaft, thereby to enable to suppress transmission of a braking torque or the like from the stopped motor to the output shaft, without a control of the clutch.

Further, the abnormality determination unit is configured to, when the single drive control unit performs the single drive control, change the stopped motor into the drive state in which the rotation direction is in a direction opposite to the rotation direction of the drive motor to which the drive state is assigned, and determine an abnormality of the stopped motor based on the predetermined state quantity of the stopped motor. In this configuration, when the stopped motor is changed into the drive state such that the rotation direction is opposite to the rotation direction of the driving motor, the one-way clutch is caused to switch into the state in which a braking torque or the like is not transmittable from the stopped motor to the output shaft, thereby to enable to determine an abnormality of the stopped motor at arbitrary timing without changing the output of the output shaft.

According to a sixth example, a battery configured to supply power to the plurality of motors is further included. An electric disconnection mechanism configured to electrically disconnect between the motors and the battery is further included. The electric disconnection mechanism is configured to, when the single drive control unit performs the single drive control, electrically disconnect between the stopped motor, to which the stop state is assigned, and the battery.

According to the above configuration, the electric movable body includes the battery configured to supply power to the plurality of motors and the electric disconnection mechanism configured to electrically disconnect between the motors and the battery. Therefore, the electric disconnection mechanism electrically disconnects between the motor assigned with the stop state (stopped motor) and the battery, thereby to enable to suppress transmission of a braking torque or the like from the stopped motor to the output shaft. Therefore, even in the configuration in which the electric movable body does not include the clutch configured to switch between the state, in which the torque is transmitted from the motor to the output shaft, and the state, in which the torque is not transmittable, the configuration enables to suppress transmission of a braking torque or the like from the stopped motor to the output shaft. Further, in the configuration in which the electric movable body includes the clutch, the clutch and the electric disconnection mechanism enables to doubly suppress transmission of a braking torque or the like from the stopped motor to the output shaft.

The electric disconnection mechanism is configured to, when the single drive control unit performs the single drive control, electrically disconnect between the stopped motor, to which the stop state is assigned, and the battery. Therefore, the electric disconnection mechanism electrically disconnects between the stopped motor and the battery when the single drive control is performed, thereby to enable to suppress transmission of a braking torque or the like from the stopped motor to the output shaft.

According to a seventh example, when the single drive control unit performs the single drive control, the stopped motor, to which the stop state is assigned from among the motors, is driven with a constant torque that is smaller than an output torque of the drive motor, to which the drive state is assigned.

According to the above configuration, when the single drive control is performed, the stopped motor is driven with the constant torque that is smaller than the output torque of the drive motor, thereby to enable to suppress transmission of a braking torque from the stopped motor to the output shaft. Therefore, even in the configuration in which the electric movable body does not include the clutch configured to switch between the state, in which the torque is transmitted from the motor to the output shaft, and the state, in which the torque is not transmittable, the configuration enables to suppress transmission of a braking torque from the stopped motor to the output shaft.

When temperature of a magnet of the motor is lower than a predetermined temperature (e.g., −20° C.), the output of the motor may drop to be lower than a reference output.

In this respect, according to an eight example, when a stopped motor, to which the stop state is assigned from among the motors, is not determined to be abnormal, and when temperature of a magnet of the stopped motor is lower than a predetermined temperature, the stopped motor is driven with a constant torque, which is smaller than an output torque of the drive motor to which the drive state is assigned. Therefore, the temperature of the magnet of the stopped motor can be increased, compared to a configuration where the stopped motor is maintained in the stop state, thereby to enable to suppress an output of the stopped motor from becoming lower than the reference output when the stopped motor is to be driven.

According to a ninth example, the output shaft is one of the output shafts, the motors are configured to drive the respective output shafts, and the battery is one of a plurality of batteries. The motors and the batteries are connected to each other, such that each of the batteries is configured to supply electric power to a motor set each configured to drive one of the output shafts. The single drive control unit is configured to, in the single drive control, assign either the drive state or the stop state to each of the motors, such that each of the output shafts is driven by a same number of the motors, and such that each of the batteries supplies electric power to a same number of the motors. The electric movable body comprises: a switching unit is configured to, when an abnormal motor determined by the abnormality determination unit is in the drive state, perform a switching control to switch the abnormal motor into the stop state and to switch one of a plurality of switched motors, which is in the stop state and configured to drive the output shaft driven by the abnormal motor, into the drive state; and a reassignment control unit configured to, when the switching unit performs the switching control, perform a reassignment control to assign either the drive state or the stop state to one of the motors, which constitutes the motor set including the abnormal motor, and to one of the motors, which constitutes the motor set including the switched motor, such that each of the output shafts is driven by a same number of the motors, and such that each of the batteries supplies electric power to a same number of the motors.

According to the above configuration, the electric movable body includes the plurality of output shafts, the plurality of motors configured to drive the output shafts, and the plurality of batteries. Therefore, even in a case where an abnormality occurs in one of the motors that drive the output shaft, the output shaft can be driven by another motor that drives the output shaft driven by the abnormal motor.

The motors and the batteries are connected to each other, such that each of the batteries is configured to supply electric power to a motor set each configured to drive one of the output shafts. Therefore, even when an abnormality occurs in the battery that supplies electric power to one motor set, another battery supplies electric power to another motor set, thereby to enable to cause the motor to drive the output shafts. The single drive control unit is configured to, in the single drive control, assign either the drive state or the stop state to each of the motors, such that each of the output shafts is driven by the same number of the motors, and such that each of the batteries supplies electric power to a same number of the motors. Therefore, while the number of motors driving each output shaft is equalized, it is possible to suppress unevenness in the amount of power supplied by respective battery.

The switching unit is configured to, when the abnormal motor, which is the motor determined to be abnormal by the abnormality determination unit, is in the drive state, switch the abnormal motor into the stop state. Therefore, when the abnormal motor is in the drive state, it is possible to switch the abnormal motor into the stop state, thereby to enable to suppress movement of the electric movable body from becoming unstable. Further, the switching unit is configured to perform the switching control to switch the switched motor, which is one of the motors in the stop state among the motors that is to drive the output shaft driven by the abnormal motor, into the drive state. Therefore, even when the abnormal motor is switched from the drive state to the stop state, it is possible to suppress decrease in the number of the motors that drive the output shaft driven by the abnormal motor.

Herein, when the abnormal motor is switched into the stop state, and when the switched motor is switched into the drive state, the number of motors, to which electric power is supplied by the battery that supplies electric power to the motor set including the abnormal motor and the battery that supplies electric power to the motor set including the switching motor, changes. Therefore, it is concerned that a difference occurs in the number of motors to which each battery supplies electric power, and that an amount of power supplied by each battery may become uneven. In this respect, a reassignment control unit is configured to, when the switching unit performs the switching control, perform the reassignment control to assign either the drive state or the stop state to one of the motors, which constitutes the motor set including the abnormal motor, and to one of the motors, which constitutes the motor set including the switched motor, such that each of the output shafts is driven by a same number of the motors, and such that each of the batteries supplies electric power to a same number of the motors. Therefore, even when an abnormality occurs in the motor, it is possible to suppress unevenness in the amount of power supplied by respective battery.

According to a tenth example, a plurality of cooling devices are included. The motors and the cooling devices are connected to each other correspondingly to connection between the motors and the batteries, such that each of the cooling devices is configured to supply coolant to motor sets each configured to drive one of the output shafts. The single drive control unit is configured to assign, in the single drive control, either the drive state or the stop state to each of the motors, such that each of the output shafts is driven by a same number of the motors, and such that each of the cooling devices cools a same number of the motors in the drive state. The reassignment control unit is configured to, when the switching unit performs the switching control, assign, in the reassignment control, either the drive state or the stop state to the motor set, which includes the abnormal motor, and to the motor set, which includes the switched motor, such that each of the output shafts is driven by the same number of the motors, and such that each of the cooling devices cools the same number of the motors in the drive state.

According to the above configuration, the electric movable body includes the plurality of output shafts, the plurality of motors configured to drive the output shafts, and the plurality of cooling devices. Therefore, even in a case where an abnormality occurs in one of the motors that drive the output shaft, the output shaft can be driven by another motor that drives the output shaft driven by the abnormal motor.

The motors and the cooling devices are connected to each other correspondingly to connection between the motors and the batteries, such that each of the cooling devices is configured to supply coolant to motor sets each configured to drive one of the output shafts. Therefore, even when an abnormality occurs in the cooling device that supplies coolant to one motor set, refrigerant is supplied from another cooling device to another motor set to drive the motor to which the refrigerant is supplied, thereby to enable to cause the motor to drive the output shafts, while the motor set is cooled. Further, The single drive control unit is configured to assign, in the single drive control, either the drive state or the stop state to each of the motors, such that each of the output shafts is driven by a same number of the motors, and such that each of the cooling devices cools a same number of the motors in the drive state. Therefore, while the number of motors driving each output shaft is equalized, it is possible to suppress unevenness in the cooling load of respective cooling device.

As described above, the switching unit is configured to, when the abnormal motor, which is the motor determined to be abnormal by the abnormality determination unit, is in the drive state, switch the abnormal motor into the stop state. Furthermore, the switching unit is configured to perform the switching control to switch the switched motor, which is one of the motors in the stop state among the motors that is to drive the output shaft driven by the abnormal motor, into the drive state.

Herein, when the abnormal motor is switched into the stop state, and when the switched motor is switched into the drive state, the number of motors, which are in the drive state and cooled by the cooling device, which supplies coolant to the motor set including the abnormal motor, and the cooling device, which supplies coolant to the motor set including the switched motor, changes. Therefore, it is concerned that a difference occurs in the number of the motors, which are in the drive state and are cooled by the cooling device, and that a cooling load for the cooling device may become uneven. In this respect, The reassignment control unit is configured to, when the switching unit performs the switching control, assign, in the reassignment control, either the drive state or the stop state to the motor set, which includes the abnormal motor, and to the motor set, which includes the switched motor, such that each of the output shafts is driven by a same number of the motors, and such that each of the cooling devices cools a same number of the motors in the drive state. Therefore, even when an abnormality occurs in the motor, it is possible to suppress unevenness in the cooling load of respective cooling device.

First Embodiment

The first embodiment embodied in an electric aircraft having a plurality of motors and a plurality of batteries is described below with reference to the drawings.

As shown in FIG. 1, an electric aircraft 10 includes batteries 21 and 22, propulsion units 51 and 52, output shafts 31 and 32, propellers 41 and 42, and the like. The electric aircraft 10 has a plurality of sets of these configurations, but here, one set shown in FIG. 1 is described.

The batteries 21 and 22 are chargeable and dischargeable secondary batteries, and have the same rated voltage and rated capacity.

The propulsion units 51 and 52 receive power supply from both of the batteries 21 and 22 and output driving force for propulsion.

The propulsion unit 51 includes inverter (INV) units 61 and 62 and motors 71 and 72. The INV units 61 and 62 convert Direct Current (DC) power supplied from the batteries 21 and 22, respectively, into Alternative Current (AC) power, and supply the AC power to the motors 71 and 72, respectively. The battery 21 is connected to the INV unit 61 and the battery 22 is not connected thereto. The battery 22 is connected to the INV unit 62 and the battery 21 is not connected thereto. That is, separate batteries 21 and 22 are respectively connected to the INV units 61 and 62 of the propulsion unit 51. The INV unit and the motor to which the INV unit supplies electric power are collectively referred to as a system. For example, the INV unit 61 and the motor 71 constitute a system.

The motors 71 and 72 are, for example, three-phase Alternative Current motors (i.e., AC motors), and rotate their own rotating shafts with AC power supplied from the INV units 61 and 62, respectively. The rotating shafts of the motors 71 and 72 are directly connected to, or coupled with, the output shaft 31. Therefore, a rotation speed of the motor 71, a rotation speed of the motor 72, and a rotation speed of the output shaft 31 become equal. The output shaft 31 is directly connected to, or coupled with, the propeller 41. Note that the rotating shafts of the motors 71 and 72 may be coupled with the output shaft 31 via a speed reducer (e.g., transmission).

The propulsion unit 52 has a configuration similar to that of the propulsion unit 51. That is, the propulsion unit 52 includes INV units 63, 64 and motors 73, 74 corresponding to the INV units 61, 62 and motors 71, 72 of the propulsion unit 51. The INV units 63, 64 convert DC power supplied from the batteries 21, 22, respectively, into AC power, and supply the AC power to the motors 71, 72, respectively. The battery 21 is connected to the INV unit 63 and the battery 22 is not connected thereto. The battery 22 is connected to the INV unit 64 and the battery 21 is not connected thereto. That is, separate batteries 21 and 22 are respectively connected to the INV units 63 and 64 of the propulsion unit 52.

The rotating shafts of the motors 73 and 74 are directly connected to, or coupled with, the output shaft 32. Therefore, the rotation speed of the motor 73, the rotation speed of the motor 74, and the rotation speed of the output shaft 32 are equal. The output shaft 32 is directly connected to, or coupled with, the propeller 42.

The motors 71 and 73 form a first motor set that drives separate output shafts 31 and 32, respectively. The motors 72 and 74 form a second motor set that drives separate output shafts 31 and 32, respectively. That is, the motors 71 to 74 (a plurality of motors) and the batteries 21 and 22 (a plurality of batteries) are connected to supply electric power from each of the batteries 21 and 22 (each battery) to both of the first motor set and the second motor set including the motors respectively driving output shafts 31, 32 (separate output shafts).

Figure 2:
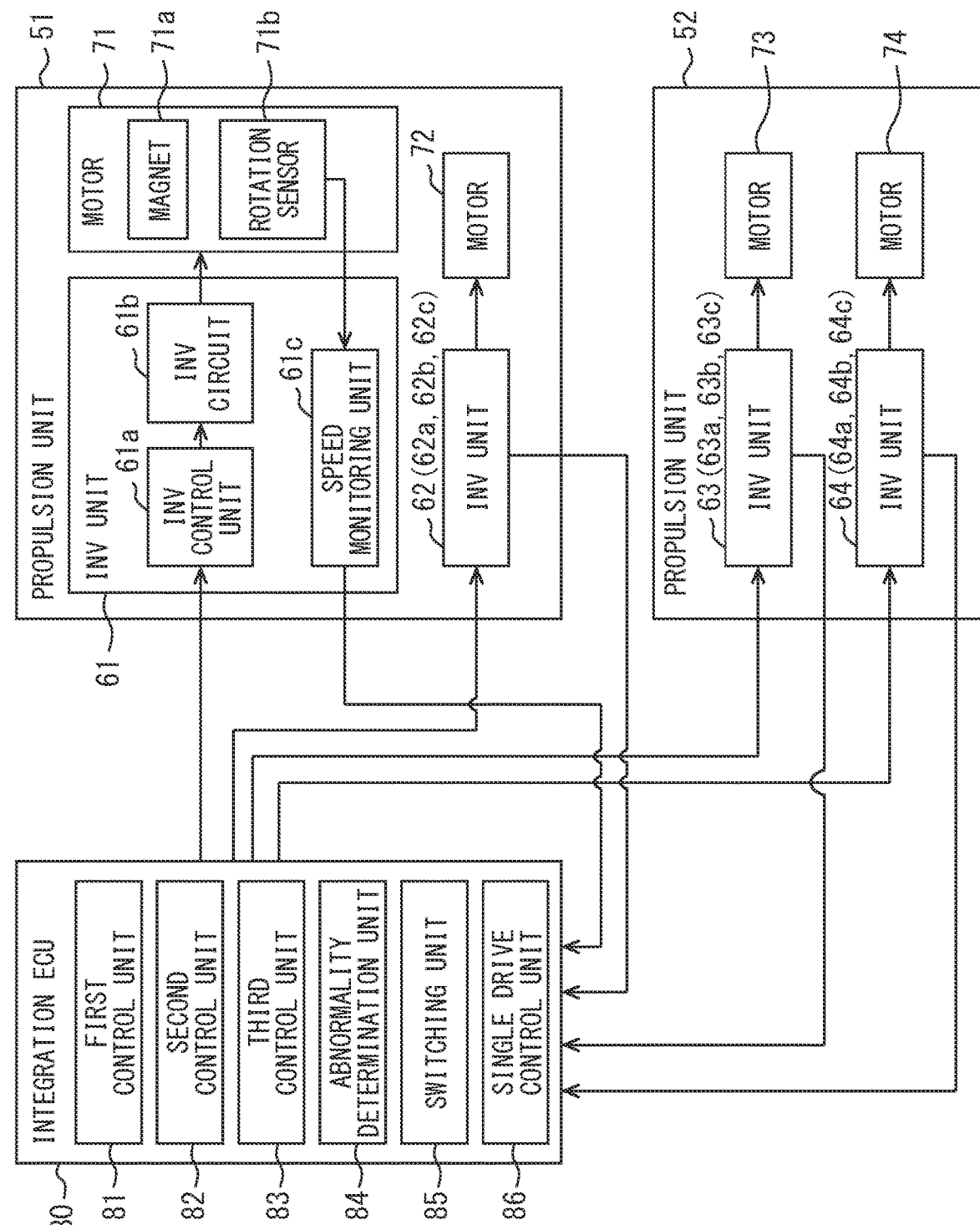
FIG. 2 is a block diagram of the electric aircraft of the first embodiment.

FIG. 2 is a block diagram of the electric aircraft 10.

The INV unit 61 includes an INV control unit 61a, an INV circuit 61b, a speed monitoring unit 61c, and the like. The INV circuit 61b is a well-known three-phase full bridge circuit (see FIG. 3). The INV control unit 61a controls each of switching elements of the INV circuit 61b based on an instruction from an integration ECU 80. The INV unit 62 includes an INV control unit 62a, an INV circuit 62b, and a speed monitoring unit 62c. The INV unit 63 includes an INV control unit 63a, an INV circuit 63b, and a speed monitoring unit 63c. The INV unit 64 includes an INV control unit 64a, an INV circuit 64b, and a speed monitoring unit 64c.

The motor 71 includes a magnet 71a that generates a magnetic field, a rotation sensor 71b that detects a rotation speed of its own rotating shaft, and the like. When temperature of the magnet 71a drops below, for example, −20° C. (i.e., predetermined temperature), the magnetic field generated by the magnet 71a becomes weaker than a reference magnetic field. As a result, an output of the motor 71 becomes lower than a reference output. The rotation sensor 71b detects a rotation speed of the rotating shaft of the motor 71 (hereinafter referred to as a rotation speed of the motor 71) and outputs a detected rotation speed to the speed monitoring unit 61c.

The speed monitoring unit 61c monitors whether or not the rotation speed of the motor 71 input from the rotation sensor 71b is out of a predetermined threshold range. The predetermined threshold range is a range from an upper limit value to a lower limit value including a speed instruction for instructing the rotation speed of the motor 71. The speed monitoring unit 61c detects that the rotation speed of the motor 71 is abnormal (i.e., speed abnormality) when a state in which the rotation speed of the motor 71 is out of the predetermined threshold range continues for more than a predetermined time Te, and transmits to the integration ECU 80 that the speed abnormality has been detected. It should be noted that the fact that the rotation speed of the motor 71 is abnormal (i.e., speed abnormality) includes a case where the motor 71 is abnormal and a case where the INV unit 61 is abnormal. Further, the speed monitoring unit 61c detects that the rotation speed of the motor 71 is normal (i.e., speed normality) when a state in which the rotation speed of the motor 71 is within the predetermined threshold range continues for more than the predetermined time Te, transmits to the integration ECU 80 that the speed normality has been detected.

The INV unit 62 has a configuration similar to that of the INV unit 61. The motor 72 has a configuration similar to that of the motor 71. The propulsion unit 52 has a configuration similar to that of the propulsion unit 51.

The integration ECU 80 includes a first control unit 81, a second control unit 82, a third control unit 83, an abnormality determination unit 84, a switching unit 85, a single drive control unit 86, and the like.

The first control unit 81 performs a first control, which assigns active or standby to each of the motors 71 to 74 driving either the output shaft 31 or the output shaft 32, so that each of the output shafts 31, 32 is driven by the same number of motors, and each of the batteries 21, 22 supplies electric power to the same number of motors. As the first control, for example, a first pattern and a second pattern are switched periodically. The first pattern is a pattern in which the motors 71 and 74 are active (i.e., drive state) and the motors 72 and 73 are on standby (i.e., stop state). The second pattern is a pattern in which the motors 72 and 73 are active and the motors 71 and 74 are standby. This makes it possible to reduce a difference in the degree of wear of the INV units 61 to 64 and a difference in the degree of wear of the motors 71 to 74.

In the first pattern, the first control unit 81 transmits a drive permission instruction and a speed instruction to the INV control units 61a and 64a corresponding to the motors 71 and 74 to which active is assigned. The INV control units 61a and 64a control the switching elements of the INV circuits 61b and 64b so that the rotation speeds of the motors 71 and 74 match the speed instructions. The first control unit 81 transmits a stop instruction (i.e., a speed instruction of speed zero, in other words) to the INV control units 62a and 63a corresponding to the motors 72 and 73 to which standby is assigned. The INV control units 61a and 64a control the switching elements of the INV circuits 62b and 63b to stop the motors 72 and 73 (i.e., rotation speed=0). The same applies to the second pattern.

Figure 3:
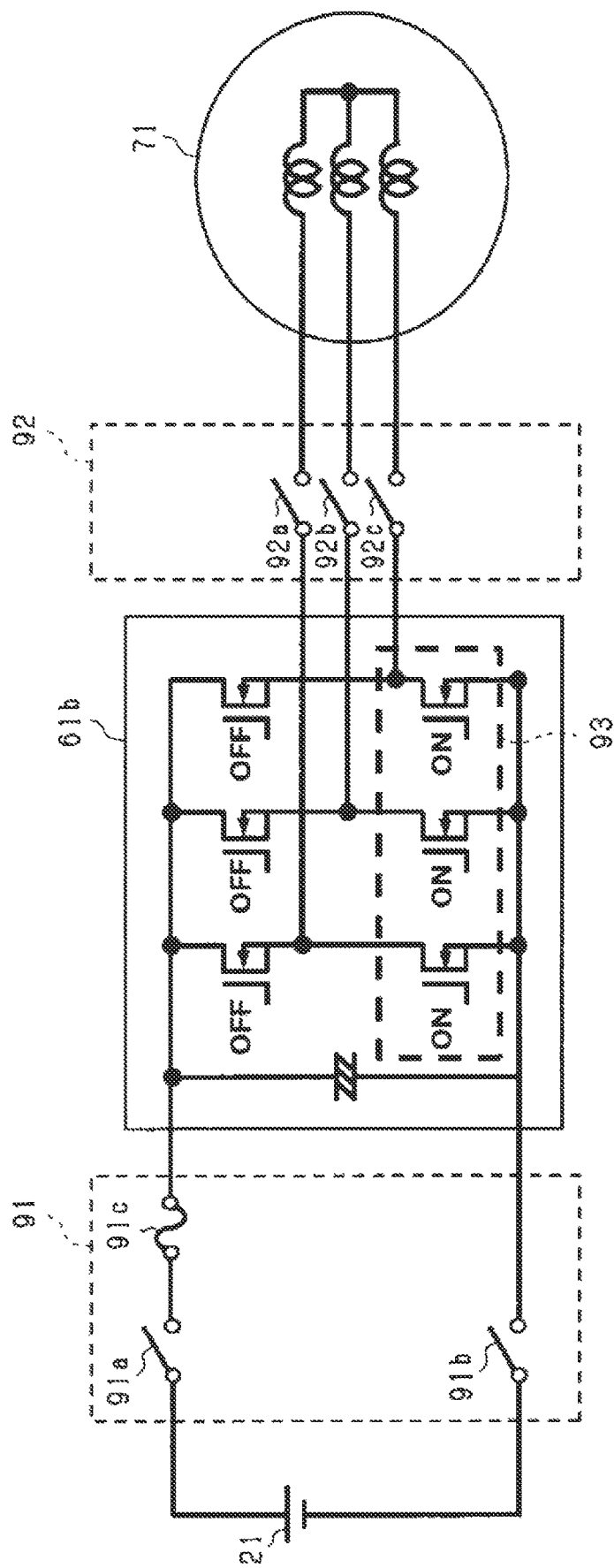
FIG. 3 is an electrical circuit diagram showing a mechanism for electrically disconnecting between a motor and a battery.

When performing the first control, the integration ECU 80 electrically disconnects between the standby motor (i.e., stopped motor), which is the motor to which standby is assigned, and the battery corresponding to the standby motor by using a first switch unit 91 (i.e., electric disconnection mechanism), as shown in FIG. 3. The first switch unit 91 includes switches 91a and 91b, a fuse 91c, and the like. The switches 91a and 91b disconnect and connect the battery 21 and the INV circuit 61b. A standby motor and an INV unit that supplies electric power to the standby motor are collectively referred to as a standby system.

Note that the integration ECU 80 may electrically disconnect between the standby motor and the battery corresponding to the standby motor by using the second switch unit 92 (i.e., electric disconnection mechanism) when performing the first control. The second switch unit 92 includes switches 92a to 92c and the like. The switches 92a to 92c disconnect and connect between the INV circuit 61b and the motor 71. Further, the integration ECU 80 may short-circuit the three-phase wiring of the motor 71 by the third switch unit 93 when performing the first control. That is, the standby motor and the battery corresponding to the standby motor may be substantially electrically disconnected by using the third switch unit 93 (i.e., electric disconnection mechanism). The third switch unit 93 is composed of a lower arm switch of the INV circuit 61b.

When the first control unit 81 is performing the first control, the abnormality determination unit 84 determines abnormality of the active motor based on the rotation speed (i.e., a predetermined state quantity correlated with the drive state) of the active motor (i.e., drive motor), which is a motor to which active is assigned. Specifically, the abnormality determination unit 84 determines abnormality of the active motor based on the speed abnormality detection result from the speed monitoring unit 61c. For example, when a speed abnormality of the motor 71 is received from the speed monitoring unit 61c, it is determined that the motor 71 is abnormal. Since the abnormality of the motor 71 is determined based on the speed abnormality detection result from the speed monitoring unit 61c, when it is determined that the active motor is abnormal, such a situation includes a case where the motor 71 is abnormal and a case where the INV unit 61 is abnormal. An active motor and an INV unit that supplies electric power to the active motor are collectively referred to as an "active system."

The switching unit 85 performs a switching control, in which an abnormal motor is switched to standby when the abnormal motor that is determined as abnormal by the abnormality determination unit 84 is active, and a switched motor, which is one of the standby motors that drives the same output shaft driven by the abnormal motor, is switched to active. The switching unit 85 transmits a drive permission instruction and a speed instruction to an INV control unit corresponding to the switched motor, and transmits a stop instruction to an INV control unit corresponding to the abnormal motor.

When the switching control has been performed by the switching unit 85, the second control unit 82 performs a second control, which assigns active or standby to each of the motors constituting a motor set including the abnormal motor, and a motor set including the switched motor, so that each output shaft is driven by the same number of motors, and each battery supplies electric power to the same number of motors. The third control unit 83 and the single drive control unit 86 are described later.

Figure 4:
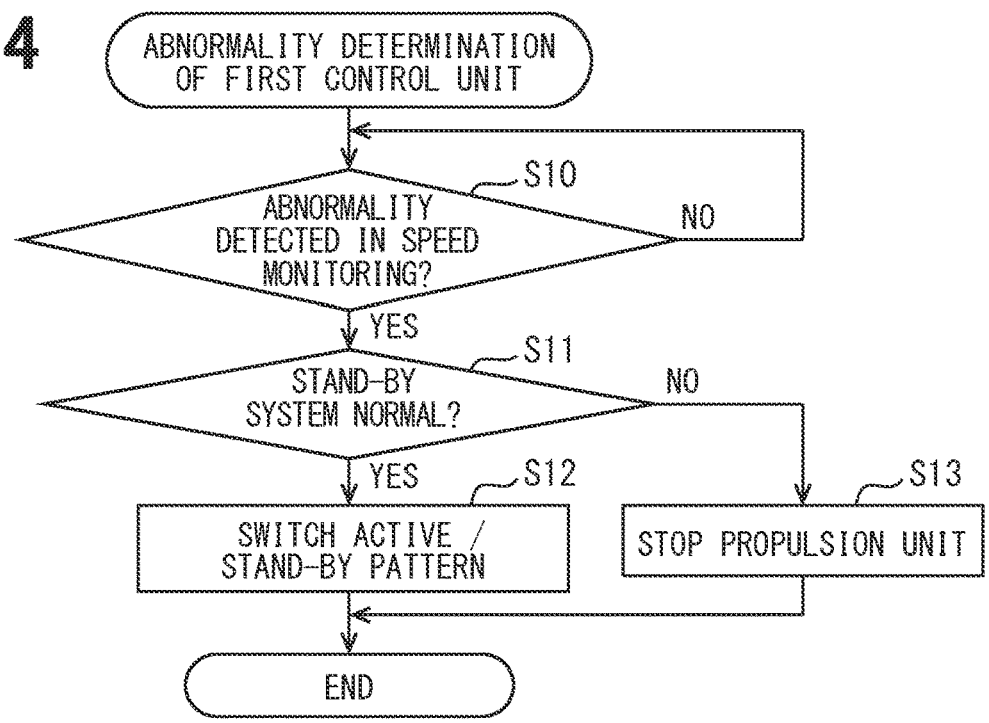
FIG. 4 is a flowchart showing a processing procedure for abnormality determination during a first control.

FIG. 4 is a flowchart showing a processing procedure for abnormality determination during the first control. This series of processes is performed by the integration ECU 80.

First, it is determined whether or not it is received from the speed monitoring unit of any of the INV units that a motor rotation speed abnormality (i.e., speed abnormality) has been detected (S10). In such determination, if it is determined that the detection of the speed abnormality has not been received from the speed monitoring unit of any of the INV units (S10: NO), the process of S10 is performed again.

On the other hand, if it is determined that a speed abnormality has been detected from the speed monitoring unit of any of the INV units (S10: YES), it is determined whether or not a standby system that drives the same output shaft driven by an abnormal system, which is a system in which the speed abnormality has been detected, is normal (S11). For example, it is determinable that the standby system is normal if the speed monitoring unit of the standby system has not detected a speed abnormality, during a time when the standby system was lastly switched to the active system, and it is determinable that the standby system is not normal if the speed monitoring unit of the standby system has detected a speed abnormality, during the above-described time. It should be noted that other methods may also be used to determine whether the standby system is normal.

When it is determined in S11 that the standby system that drives the output shaft driven by the abnormal system is normal (S11: YES), the active/standby pattern is switched (S12). For example, if the first pattern is being performed when it is determined that a speed abnormality has been detected from the speed monitoring unit of any INV unit, the first pattern is aborted and the second pattern is performed. That is, when the abnormal system is active, the abnormal system is switched to standby, and the standby system that drives the output shaft driven by the abnormal system is switched to active. Then, active or standby is assigned to the motors, or the systems, i.e., to the motor set constituting the abnormal system and to the motor set constituting the standby system, so that each output shaft is driven by the same number of systems, and each battery supplies electric power to the same number of systems. Subsequently, the series of processes is terminated (END).

On the other hand, when it is determined in S11 that the standby system that drives the output shaft driven by the abnormal system is not normal (S11: NO), the propulsion unit including the abnormal system is stopped (S13). Note that, even when the propulsion unit including the abnormal system is stopped, the electric aircraft 10 can maintain the attitude of the airframe by using other propulsion units. Subsequently, the series of processes is terminated (END).

Note that the process of S10 corresponds to a process of the abnormality determination unit 84, and the process of S12 corresponds to a process of the switching unit 85 and the second control unit 82.

Figure 5:
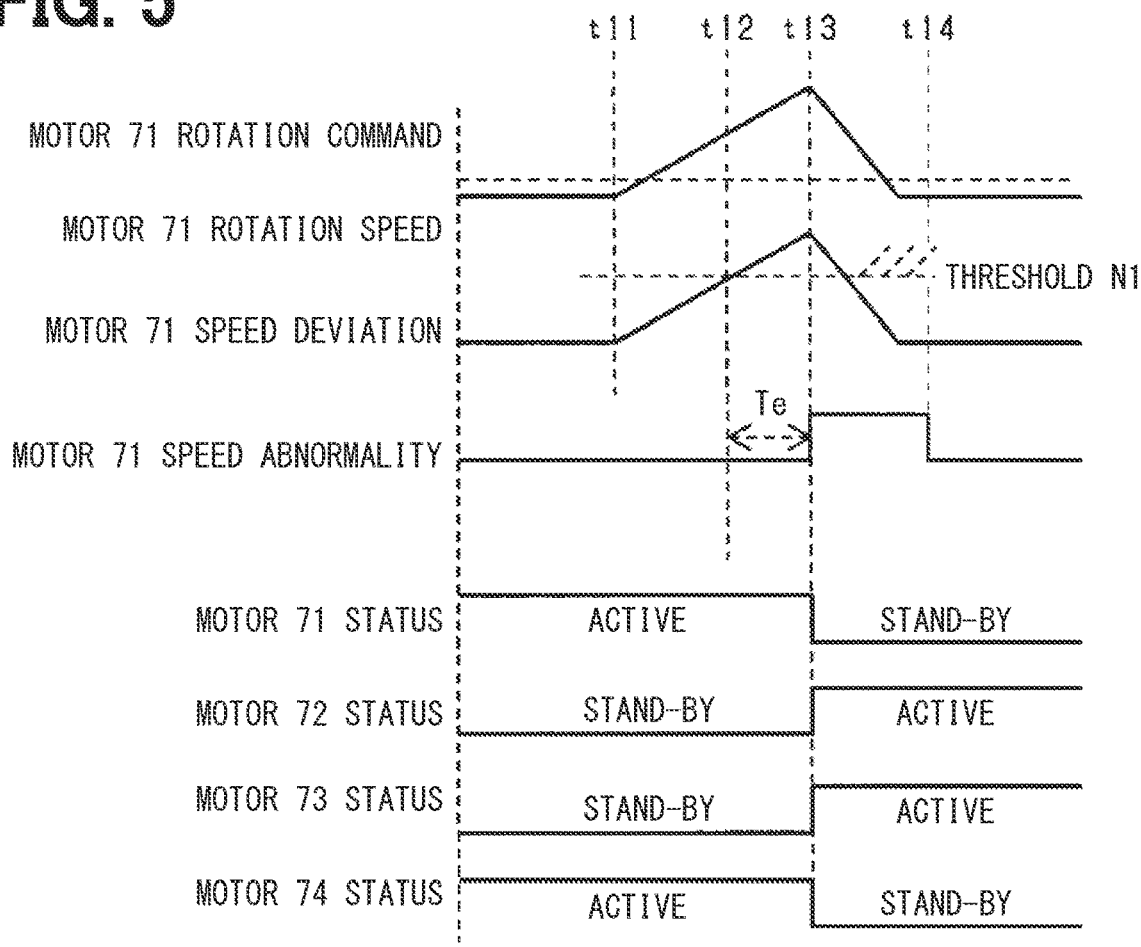
FIG. 5 is a time chart showing a mode of abnormality determination during the first control.

FIG. 5 is a time chart showing how an abnormality is determined during the first control. Here, an example is described in which it is detected that the rotation speed of the motor 71 is abnormal (i.e., speed abnormality) while the first pattern is being performed. Although FIG. 5 shows the speed instruction, the rotation speed, the speed deviation, and the speed abnormality only for the motor 71, the speed instruction, the rotation speed, the speed deviation, and the speed abnormality are also acquired for each of the motors 72 to 74.

At time t11, an abnormality occurs in the system composed of the INV unit 61 and the motor 71, and the rotation speed of the motor 71 starts to increase despite the speed instruction of the motor 71. Along with the above, a speed deviation of the motor 71, which is a value obtained by subtracting the speed instruction for the motor 71 from a rotation speed of the motor 71, starts to increase.

At time t12, the speed deviation of the motor 71 exceeds a threshold value N1, that is, the rotation speed of the motor 71 is out of a predetermined threshold range.

At time t13, a duration of a state in which the rotation speed of the motor 71 is out of the predetermined threshold range exceeds a predetermined time Te. Therefore, it is detected that the rotation speed of the motor 71 is abnormal (i.e., speed abnormality). Then, the first pattern in which the motors 71 and 74 are active and the motors 72 and 73 are on standby is switched to the second pattern in which the motors 72 and 73 are active and the motors 71 and 74 are standby.

At time t14, the duration of the state in which the rotation speed of the motor 71 is within the predetermined threshold range exceeds the predetermined time Te. Therefore, it is detected that the rotation speed of the motor 71 is normal (i.e., speed normality).

The present embodiment described above in detail has the following advantages.

The electric aircraft 10 includes the output shafts 31 and 32, the motors 71 and 72 and the motors 73 and 74 that drive the output shafts 31 and 32, and the batteries 21 and 22. Therefore, even when an abnormality occurs in any of the motors 71 to 74 that drive the output shafts 31 and 32, the other motors that drive the output shafts driven by the motor in which the abnormality has occurred are capable of driving the output shafts.

The motors 71 to 74 and the batteries 21 and 22 are connected to supply electric power from each of the batteries 21 and 22 to both of the first motor set and the second motor set driving the output shafts 31, 32. Therefore, even when an abnormality occurs in the battery that supplies electric power to one motor set, the output shafts 31 and 32 can still be driven by the other motor by supplying electric power to the other motor set from the other battery. Further, the first control unit 81 performs the first control, which assigns active (i.e., drive state) or standby (i.e., stop state) to each of the motors 71, 72, 73 and 74 driving either the output shaft 31 or the output shaft 32, so that each of the output shafts 31, 32 is driven by the same number of motors, and each of the batteries 21, 22 supplies electric power to the same number of motors. Therefore, while each of the output shafts 31 and 32 is driven by the same number of motors, unevenness in the amount of electric power supplied from each of the batteries is suppressible.

The abnormality determination unit 84 determines abnormality of the motors 71 to 74. The switching unit 85 switches the abnormal motor to the stop state when the abnormal motor determined by the abnormality determination unit 84 as abnormal is in the drive state. Therefore, when the abnormal motor is in the drive state, the abnormal motor is switchable to the stop state, thereby making it possible to prevent the movement of the electric aircraft 10 from becoming unstable. Further, the switching unit 85 performs the switching control to switch the switched motor, which is one of the stopped motors among the motors that drive the output shaft driven by the abnormal motor, to the drive state. Therefore, even when the abnormal motor is switched from the drive state to the stop state, it is possible to suppress the decrease in the number of motors that drive the output shaft driven by the abnormal motor.

When the abnormal motor is switched to the stop state and the switched motor is switched to the drive state, the number of motors constituting a motor set including the abnormal motor and the number of motors constituting a motor set including the switched motor change, in terms of receiving supply of electric power from one of two batteries. Therefore, the numbers of motors receiving supply of electric power from the batteries 21 and 22 become different, and the amount of electric power supplied from each of the batteries may become uneven. In this respect, when the switching unit 85 performs the second control, which assigns either the drive state or the stop state to the motors constituting the motor set including the abnormal motor and to the motors constituting the motor set including the switched motor, so that each of the output shafts 31 and 32 is driven by the same number of motors, and each of the batteries 21, 22 supplies electric power to the same number of motors. Therefore, even when an abnormality occurs in the motor, it is possible to suppress unevenness in the amount of electric power supplied from each battery.

When the first control is being performed by the first control unit 81, the abnormality determination unit 84 determines the abnormality of the drive motor based on the predetermined state amount (i.e., rotation speed). According to such a configuration, when the first control is being performed, which assigns the drive state or the stop state to the motors 71, 72 and the motors 73, 74 that drive the output shafts 31, 32, abnormality of the drive motor is determinable, thereby increasing the frequency of such determination.

The electric aircraft 10 includes an electric disconnection mechanism (i.e., the first switch unit 91, the second switch unit 92, and the third switch unit 93) that electrically disconnects between the motors 71 to 74 and the batteries 21, 22. Therefore, by electrically disconnecting the motor to which the stop state is assigned (i.e., stopped motor) from the battery by the electric disconnection mechanism, transmission of braking torque and the like from the stopped motor (i.e., standby motor) to the output shaft is suppressible. Therefore, even when the electric aircraft 10 does not have a clutch that switches between a state in which a torque is transmitted from the motors 71 to 74 to the output shafts 31 and 32 and a state in which a torque is not transmitted, transmission of the braking torque and the like from the stopped motor to the output shafts is suppressible.

When the first control is being performed by the first control unit 81, the electric disconnection mechanism electrically disconnects between the stopped motor, to which the stop state is assigned, and the battery corresponding to the stopped motor. Therefore, when the first control is being performed, the electric disconnection mechanism electrically disconnects between the stopped motor and the battery, thereby suppressing transmission of the braking torque or the like from the stopped motor to the output shaft.

It should be noted that the first embodiment can also be implemented with the following changes. Parts that are the same as the first embodiment are denoted by the same reference numerals, and descriptions thereof are omitted.

The processing of S11 and S13 in FIG. 4 can be omitted. Even in such case, it is rare that an abnormality occurs in the active system and the standby system at the same time. Therefore, it is possible to switch the standby system to active to drive the output shaft, and to prevent the movement of the electric aircraft 10 from becoming unstable. Further, even when an abnormality occurs in any of the motors 71 to 74 that drive the output shafts 31 and 32, the number of motors that drive the output shafts driven by the abnormal motor is prevented from decreasing. In addition, unevenness in the supply amounts of electric power among the batteries is suppressible.

The third control unit 83 (i.e., a double drive control unit) performs a third control (i.e., a double drive control) that assigns the drive state (active) to the plurality of motors 71 and 72 and to the plurality of motors 73 and 74 that drive the output shafts 31 and 32.

Here, when the third control is being performed, even in case that it is determined that one of the drive motors is abnormal based on the rotation speed (i.e., the predetermined state quantity), if the rotation speeds of the plurality of drive motors are the same, an abnormal drive motor is not identifiable. In the above embodiment, since the motors 71, 72 (73, 74) are directly connected to the output shaft 31 (32), the rotation speeds of the motors 71, 72 (73, 74) are the same.

Figure 6:
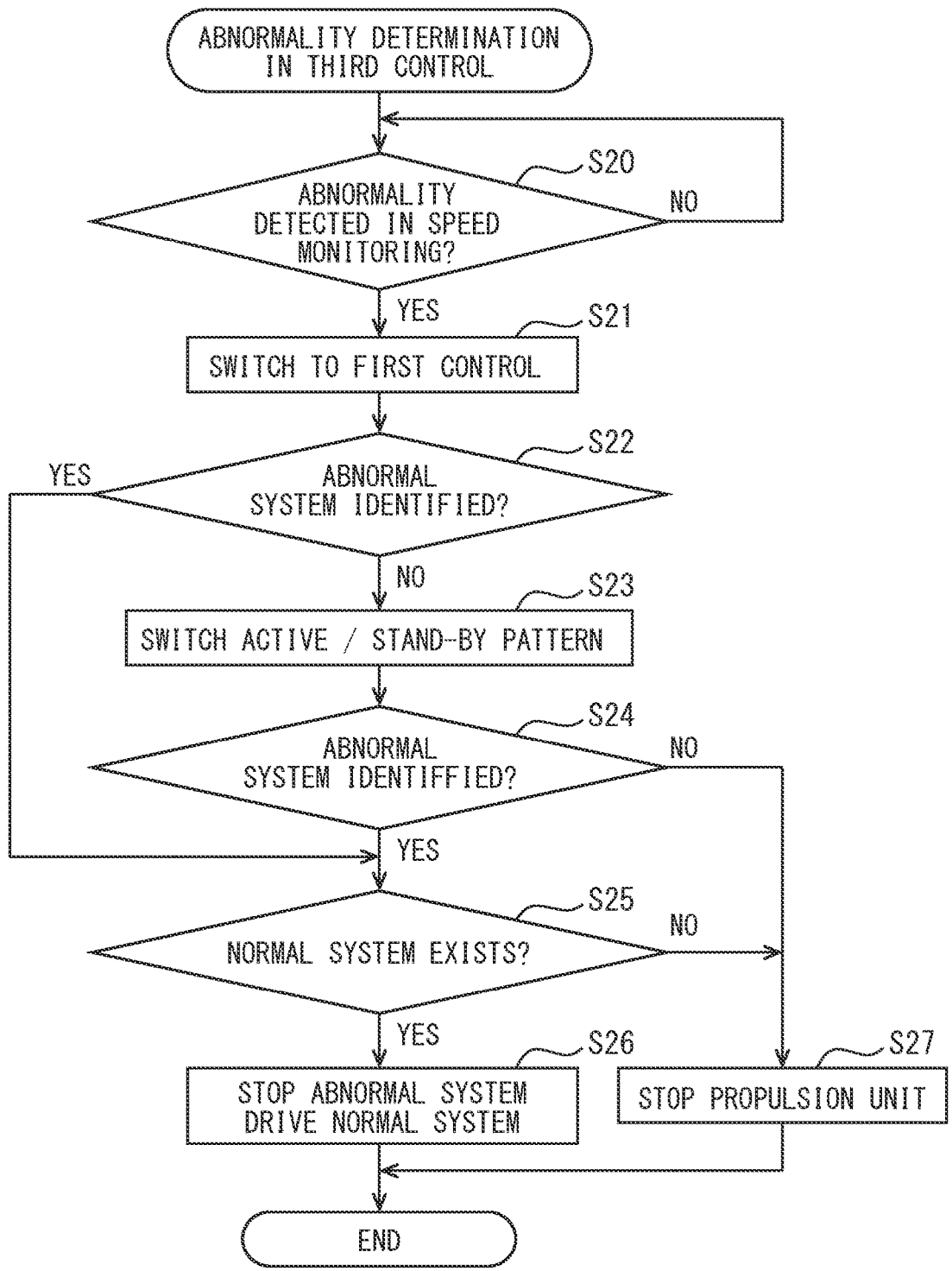
FIG. 6 is a flowchart showing a processing procedure for abnormality determination during a third control.

Therefore, the integration ECU 80 performs an abnormality determination shown in FIG. 6 during the third control.

The processing of S20 is the same as the processing of S10 in FIG. 4.

When it is determined that detection of a speed abnormality has been received from the speed monitoring unit of any of the INV units (S20: YES), the control is switched from the third control to the first control (S21).

Subsequently, it is determined whether or not the abnormal system has been identified (S22). Specifically, when a speed abnormality is detected in one of the propulsion units after switching to the first control, a system to which active is assigned in an abnormal propulsion unit, which is the propulsion unit in which the speed abnormality has been detected in the first control, is identified as an abnormal system, thereby determining that an abnormal system has been identified. When no speed abnormality is detected in the abnormal propulsion unit after switching to the first control, it is determined that the abnormal system could not be identified. In such determination, when it is determined that the abnormal system could not be identified (S22: NO), the active/standby pattern is switched (S23). The processing of S23 is the same as the processing of S12 in FIG. 4.

Subsequently, it is determined whether or not the abnormal system has been identified (S24). Specifically, when a speed anomaly is detected in an abnormal propulsion unit after switching the active/standby pattern, a system being active in the abnormal propulsion unit is identified as the abnormal system, thereby determining that the abnormal system has been identified. When no speed abnormality is detected in the abnormal propulsion unit after switching the active/standby pattern, it is determined that the abnormal system could not be identified. In such determination, when it is determined that the abnormal system has been identified (S24: YES), the process proceeds to S25. Further, when it is determined in the determination of S22 that the abnormal system has been identified (S22: YES), the process also proceeds to S25.

In S25, it is determined whether or not there is a normal system. Specifically, when it is determined that the abnormal system could not be identified in the determination of S22 (S22: NO), it is determined that the abnormal propulsion unit has a normal system. Further, when it is determined in S22 that an abnormal system has been identified (S22: YES), it is determined whether or not there is a normal system as follows. That is, when the standby system was lastly switched to the active system during switching to the first control, if the speed monitoring unit of the standby system has not detected a speed abnormality, it is determined that the standby system is normal (i.e., there is a normal system), and if the speed monitoring unit of the standby system has detected a speed abnormality, it is determined that the standby system is not normal (there is no normal system). Note that, if it is determined in S22 that the abnormal system has been identified (S22: YES), it can be determined that the abnormal propulsion unit does not have a normal system.

When it is determined in S25 that the abnormal propulsion unit has a normal system (S25: YES), the abnormal system is stopped in the abnormal propulsion unit and the normal system is driven (S26). That is, when the abnormal system is active, the abnormal system is switched to standby, and the standby system that drives the output shaft driven by the abnormal system is switched to active (i.e., switching control). Then, to the motors (system) forming the motor set including the motor of the abnormal system and to the motors (system) forming the motor set including the motor of the normal system, active or standby is assigned, so that each output shaft is driven by the same number of systems, and each battery supplies electric power to the same number of systems (i.e., second control). Subsequently, the series of processes is terminated (END).

Further, when it is determined that the abnormal system could not be identified in the determination of S24 (S24: NO), when it is determined that the abnormal propulsion unit does not have a normal system in the determination of S25 (S25: NO), the abnormal propulsion unit is stopped (S27). Subsequently, the series of processes is terminated (END).

Note that the processing of S20, S22, and S24 corresponds to the processing of the abnormality determination unit 84, the processing of S23 and S26 corresponds to the processing of the switching unit 85, and the processing of S26 corresponds to the processing of the second control unit 82.

Figure 7:
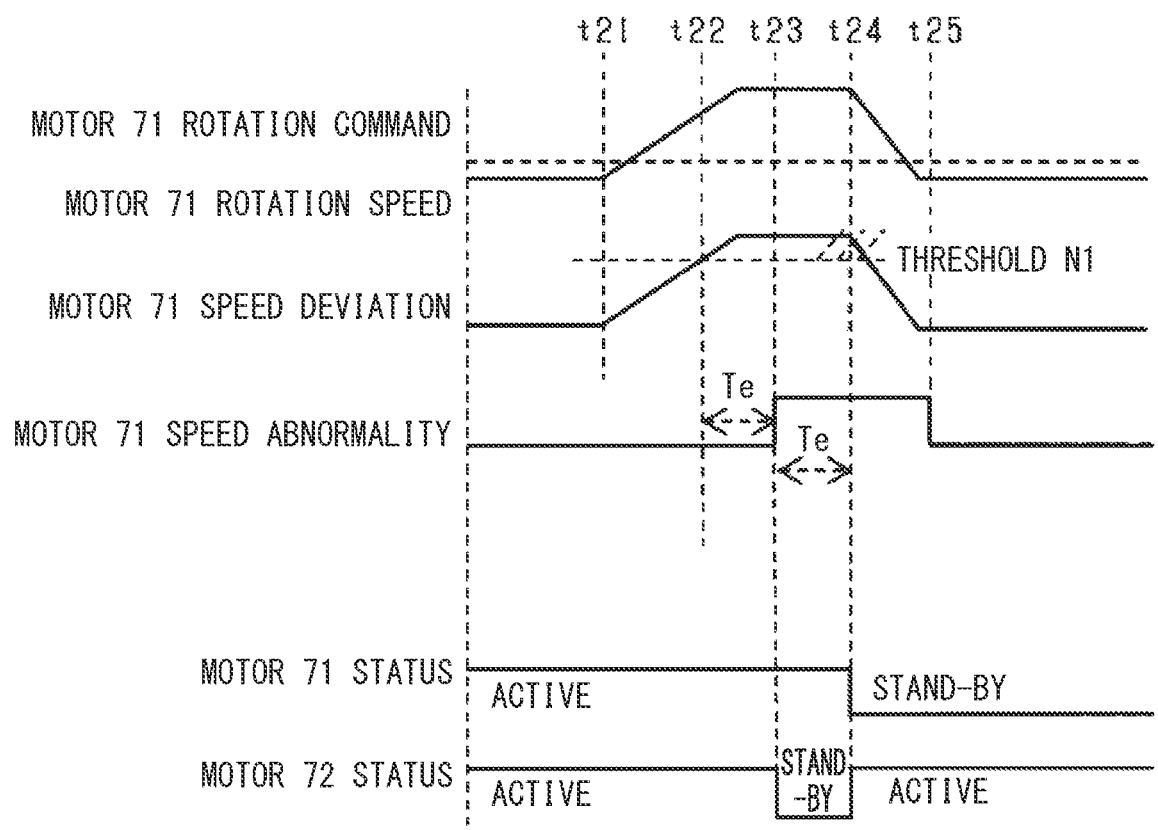
FIG. 7 is a time chart showing a mode of abnormality determination during the third control.

FIG. 7 is a time chart showing how an abnormality is determined during the third control. Here, a case in which the propulsion unit 51 detects that the rotation speed of the motor 71 is abnormal (i.e., speed abnormality) is described as an example. Although FIG. 7 shows the speed instruction, the rotation speed, the speed deviation, and the speed abnormality only for the motor 71, the speed instruction, the rotation speed, the speed deviation, and the speed abnormality are also acquired for each of the motors 72 to 74.

At time t21, an abnormality occurs in the system composed of the INV unit 61 and the motor 71, and the rotation speed of the motor 71 starts to increase despite the speed instruction of the motor 71. Along with the above, the speed deviation of the motor 71 starts to increase.

At time t22, the speed deviation of the motor 71 exceeds the threshold value N1, that is, the rotation speed of the motor 71 is out of the predetermined threshold range.

At time t23, a duration of a state in which the rotation speed of the motor 71 is out of the predetermined threshold range exceeds the predetermined time Te. Therefore, it is detected that the rotation speed of the motor 71 is abnormal (i.e., speed abnormality). Then, in the propulsion unit 51, the third control is switched to the first control. Here, in the first control, the first pattern in which the motors 71 and 74 are active and the motors 72 and 73 are on standby is performed.

At time t24, a duration of a state in which the rotation speed of the motor 71 is out of the predetermined threshold range exceeds the predetermined time Te. Therefore, it is detected that the rotation speed of the motor 71 is abnormal (i.e., speed abnormality), and the system including the motor 71 is identified as the abnormal system. Here, it is assumed that a normal system has been identified. Then, in the abnormal propulsion unit, the abnormal system including the motor 71 is put on standby, and the normal system including the motor 72 is made active. Further, the motor 73 is set to active and the motor 74 is put on standby, so that each output shaft is driven by the same number of systems, and each battery supplies electric power to the same number of systems.

At time t25, a duration of a state in which the rotation speed of the motor 71 is within the predetermined threshold range exceeds the predetermined time Te. Therefore, it is detected that the rotation speed of the motor 71 is normal (i.e., speed normality). Note that, even when the speed of the motor 71 is detected as normal, there is a possibility that the system including the motor 71 is actually abnormal.

According to the above-described configuration, the electric aircraft 10 causes the first control unit 81 to perform the first control, when the third control (i.e., the double drive control) is performed by the third control unit 83 (i.e., the double drive control unit), and the drive motor (i.e., active motor) is determined as abnormal based on the predetermined state quantity (i.e., rotation speed). Then, when the first control is being performed by the first control unit 81, the abnormality determination unit 84 identifies the abnormal drive motor based on the predetermined state quantity. That is, in other words, by assigning the drive state (active) or the stop state (standby) to the motors 71 and 72 that drive the output shaft 31 by performing the first control, whether or not the drive motor is abnormal is determinable based on the predetermined state quantity.

Second Embodiment

The second embodiment is described below with reference to the drawings mainly in terms of differences from the first embodiment. In the present embodiment, each propulsion unit has three systems and is powered by three batteries.

Figure 8:
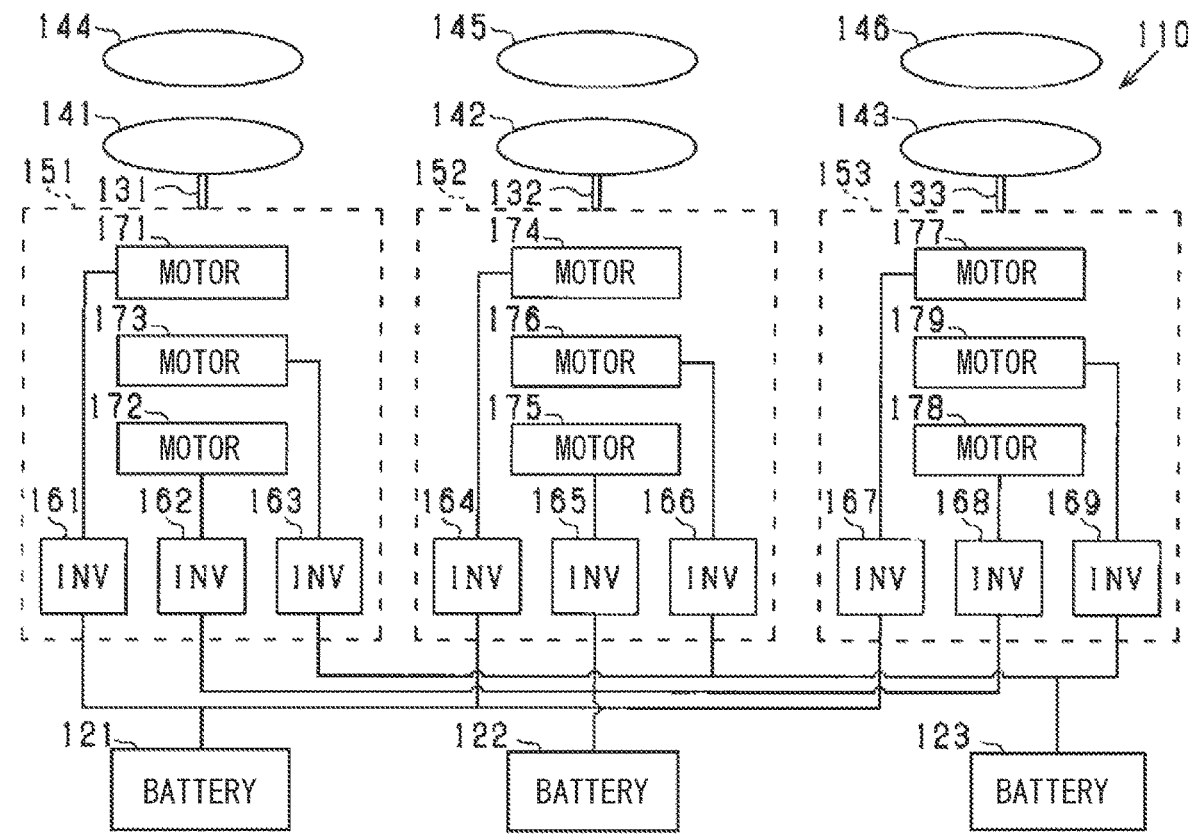
FIG. 8 is a schematic diagram of an electric aircraft according to a second embodiment.

As shown in FIG. 8, an electric aircraft 110 includes batteries 121 to 123, propulsion units 151 to 153, output shafts 131 to 133, propellers 141 to 143, and the like. The electric aircraft 110 has a plurality of sets of these components (for example, the propellers 144 to 146 are shown), but the one set shown in the drawing is described here.

The batteries 121 to 123 are chargeable/dischargeable secondary batteries, and have the same rated voltage and same rated capacity.

The propulsion units 151 to 153 each receive power supply from all of the batteries 121 to 123 and output driving force for propulsion.

The propulsion unit 151 includes inverter (INV) units 161 to 163 and motors 171 to 173. The INV units 161 to 163 convert the DC power supplied from the batteries 121 to 123, respectively, into AC power, and supply the AC power to the motors 171 to 173, respectively. The battery 121 is connected to the INV unit 161, and the batteries 122 and 123 are not connected thereto (i.e., not connected to the INV unit 161). The battery 122 is connected to the INV unit 162, and the batteries 121 and 123 are not connected thereto. The battery 123 is connected to the INV unit 163, and the batteries 121 and 122 are not connected thereto. That is, in other words, separate batteries 121 to 123 are connected to the INV units 161 to 163 of the propulsion unit 151, respectively.

The motors 171 to 173 are, for example, three-phase Alternate Current motors (i.e., AC motors), and rotate their own rotating shafts with AC power supplied from the INV units 161 to 163, respectively. The rotating shafts of the motors 171 to 173 are directly connected to, or coupled with, the output shaft 131. Therefore, the rotation speed of the motor 171, the rotation speed of the motor 172, the rotation speed of the motor 173, and the rotation speed of the output shaft 131 are equal. The output shaft 131 is directly connected to, or coupled with, the propeller 141. Note that the rotating shafts of the motors 171 to 173 may be coupled with the output shaft 131 via a reduction gear (e.g., transmission).

The propulsion unit 152 has a configuration similar to that of the propulsion unit 151. That is, the propulsion unit 152 includes INV units 164 to 166 and motors 174 to 175 corresponding to the INV units 161 to 163 and motors 171 to 173 of the propulsion unit 151. The battery 121 is connected to the INV unit 164, and the batteries 122 and 123 are not connected thereto. The battery 122 is connected to the INV unit 165, and the batteries 121 and 123 are not connected thereto. The battery 123 is connected to the INV unit 166, and the batteries 121 and 122 are not connected thereto.

The rotating shafts of the motors 174 to 175 are directly connected to, or coupled with, the output shaft 132. Therefore, the rotation speed of the motor 174, the rotation speed of the motor 175, the rotation speed of the motor 176, and the rotation speed of the output shaft 132 are equal. The output shaft 132 is directly connected to, or coupled with, the propeller 142. The propulsion unit 153 is also similar to the above.

The motors 171, 174 and 177 constitute a first motor set that drive separate output shafts 131, 132 and 133, respectively. The motors 172, 175 and 178 constitute a second motor set that drive separate output shafts 131, 132 and 133, respectively. The motors 173, 176 and 179 constitute a third motor set that drive separate output shafts 131, 132 and 133, respectively. That is, the motors 171 to 179 (a plurality of motors) and the batteries 121 to 123 (a plurality of batteries) are connected so that each of the first motor set (may also be mentioned hereafter as a first motor set), the second motor set, and the third motor set (may also be mentioned as a second and third motor set) composed of motors that respectively drive the output shafts 131 to 133 (separate output shafts) are powered from the batteries 121 to 123 (from each of the batteries).

The first control unit 81 performs the first control, which assigns the drive state or the stop state to each of the motors 171 to 179 that drive the output shafts 131 to 133, so that each of the output shafts 131 to 133 is driven by the same number of motors and each of the batteries 121 to 123 powers the same number of motors. As the first control, for example, the first pattern, the second pattern, and a third pattern are switched periodically or intermittently. The first pattern is a pattern in which the motors 171, 172, 174, 176, 178 and 179 are active (drive state) and the motors 173, 175 and 177 are on standby (stop state). The second pattern is a pattern in which the motors 171, 173, 175, 176, 177 and 178 are active and motors 172, 174 and 179 are on standby. The third pattern is a pattern in which the motors 172, 173, 174, 175, 177 and 179 are active and the motors 171, 176 and 178 are on standby. In such manner, a difference in a degree of wear of the INV units 161 to 169 and a difference in a degree of wear of the motors 171 to 179 are reducible. Note that other pattern(s) different from the above can also be performed based on a discharge current of each of the batteries 121 to 123, a predicted value of the voltage, and the like.

In each pattern, the processing performed by each INV controller (not shown) of each of the INV units 161 to 169 is the same as in the first embodiment. Further, when performing the first control, the integration ECU 80 disconnects, by using the electric disconnection mechanism, between the standby motor (i.e., stopped motor), which is a motor to which the standby is assigned, and the battery corresponding to the standby motor as in the first embodiment.

As in the first embodiment, when the first control is being performed by the first control unit 81, the abnormality determination unit 84 determines abnormality of the active motor (i.e., drive motor) to which active is assigned based on the rotation speed (i.e., the predetermined state quantity correlated with the drive state). In the first control of the present embodiment, since each propulsion unit has two active motors, when an abnormality occurs in one of the two active motors of each propulsion unit, it is determined that both of the two active motors are abnormal (i.e., an abnormal motor is not identified at this point).

Therefore, the single drive control unit 86 (see FIG. 2) performs a single drive control which assigns, when the first control (i.e., the double drive control) is performed by the first control unit 81 (i.e., the double drive control unit), and it is determined that one of the plurality of motors is abnormal, the drive state to one of the plurality of motors and the stop state to the other motors. When performing single drive control, the integration ECU 80 disconnects, by using electric disconnection mechanism, between the standby motor (stopped motor), which is a motor to which standby is assigned, and the battery corresponding to the standby motor as in the first embodiment.

The switching unit 85 performs the switching control, in which an abnormal motor is switched to standby when the abnormal motor that is determined as abnormal by the abnormality determination unit 84 is active, and a switched motor, which is one of the standby motors that drives the same output shaft driven by the abnormal motor, is switched to active. The switching unit 85 transmits the drive permission instruction and the speed instruction to an INV control unit corresponding to the switched motor, and transmits the stop instruction to an INV control unit corresponding to the abnormal motor.

When the switching control has been performed by the switching unit 85, the second control unit 82 performs the second control, which assigns active or standby to each of the motors constituting a motor set including the abnormal motor, and a motor set including the switched motor, so that each output shaft is driven by the same number of motors and each battery supplies electric power to the same number of motors.

Then, after the single drive control is performed by the single drive control unit 86, the integration ECU 80 performs an abnormality determination with the processing procedure according to the flowchart of FIG. 4.

Here, when it is determined that the standby system that drives the output shaft driven by the abnormal system is normal (S11: YES), the active/standby pattern is switched (S12). Specifically, a pattern is switched to the one in which the abnormal system is put on standby. For example, when the motor 171 is identified as an abnormal motor, the pattern is switched to the third pattern in which the motor 171 is on standby. That is, when the abnormal system is active, the abnormal system is switched to standby, and the standby system that drives the output shaft driven by the abnormal system is switched to active. Then, active or standby is assigned to the motors, or systems, i.e., to the motor set constituting the abnormal system and to the motor set constituting the standby system, so that each output shaft is driven by the same number of systems, and each battery supplies electric power to the same number of systems. Subsequently, the series of processes is terminated (END).

The present embodiment described above in detail has the following advantages. Here, only advantages different from those of the first embodiment are described.

The electric aircraft 110 includes the output shafts 131 to 133, the motors 171 to 173, the motors 174 to 176, and the motors 177 to 179 that respectively drive the output shafts 131 to 133, and the batteries 121 to 123. Therefore, even when an abnormality occurs in any of the motors 171 to 179 that drive the output shafts 131 to 133, the other motors that drive the output shaft driven by the abnormal motor in which the abnormality has occurred can still drive the relevant output shaft.

The motors 171 to 179 and the batteries 121 to 123 are connected so that electric power is supplied from each of the batteries 121 to 123 to the first motor set, the second motor set, and the third motor set, which are respectively composed of the motors that drive separate output shafts. Therefore, even when an abnormality occurs in a battery that supplies electric power to one motor set, the output shafts 131 to 133 can still be driven by the motors by supplying electric power to the other motor sets from the other batteries. Further, the first control unit 81 performs the first control, which assigns the drive state (active) or the stop state (standby) to the motors 171 to 173, the motors 174 to 176, and the motors 177 to 179 for driving the output shafts 131 to 133, so that each of the output shafts is driven by the same number of motors, and each of the batteries powers the same number of motors. Therefore, while driving the respective output shafts 131 to 133 by the same number of motors, unevenness in the supply amount of electric power from each of the batteries is suppressible.

The abnormality determination unit 84 determines abnormality of the motors 171 to 179. The switching unit 85 switches the abnormal motor to the stop state when the abnormal motor determined by the abnormality determination unit 84 as abnormal is in the drive state. Therefore, when the abnormal motor is in the drive state, the abnormal motor can be switched to the stop state, and it is possible to prevent the movement of the electric aircraft 110 from becoming unstable. Further, the switching unit 85 performs the switching control to switch the switched motor, which is one of the stopped motors among the motors that drive the output shaft driven by the abnormal motor, to the drive state. Therefore, even when the abnormal motor is switched from the drive state to the stop state, it is possible to suppress the decrease in the number of motors that drive the output shaft driven by the abnormal motor.

When the switching control has been performed by the switching unit 85, the second control unit 82 performs the second control, which assigns the drive state or the stop state to the motor set including the abnormal motor and to the motor set including the switched motor, so that each of the output shafts 131 to 133 is driven by the same number of motors, and each of the batteries 121 to 123 powers the same number of motors. Therefore, even when an abnormality occurs in the motor, it is possible to suppress unevenness in the supply amount of electric power from each of the batteries.

It should be noted that the second embodiment may be modified as follows. Parts that are the same as in the second embodiment are denoted by the same reference numerals, and descriptions thereof are omitted.

When the first control (i.e., the double drive control) is performed by the first control unit 81 (i.e., the double drive control unit) and it is determined that one of the plurality of motors is abnormal, the integration ECU 80 can identify the abnormal system by sequentially changing a combination of the motors among which the drive state is assigned to two motors and the stop state is assigned to one motor. For example, when two motors among the motors 171 to 173 are active and one motor is standby, it is assumed that the normal and abnormal motors are determined as follows. That is, it is determined that the motors 171 and 172 are abnormal, the motors 172 and 173 are normal, and the motors 171 and 173 are abnormal. In such case, it can be identified that the motor 171 (i.e., a system including the motor 171) is abnormal.

In the single drive control, when a motor to which the drive state is assigned is normal and motors to which the stop state is assigned include an abnormal motor, the abnormality determination unit 84 cannot clearly identify an abnormal motor.

Therefore, when the abnormality determination unit 84 cannot identify the abnormal drive motor, the single drive control unit 86 performs the single drive control again, in which the drive state is assigned to only one motor that is different from the motor to which the drive state had been assigned in the single drive control at the previous time or before, with other motors put in the stop state. According to such a configuration, even when the motor to which the drive state is assigned in the single drive control at the previous time or before is normal, only one other than the motor to which the drive state is assigned in the single drive control at the previous time or before is put in the drive state, for performing the single drive control and for repeating the identification of the abnormal motor by the abnormality determination unit 84. Therefore, it is possible to make it easier to identify an abnormal motor.

Further, when the abnormality determination unit 84 has identified an abnormal drive motor and the plurality of motors has included a normal motor, the electric aircraft 110 may switch, to the stop state, the drive motor having been identified as abnormal, and switch at least one of the normal motors to the drive state. According to such a configuration, after switching the drive motor identified as abnormal to the stop state, it is possible to continue driving the output shaft by the normal motor.

Third Embodiment

The third embodiment is described in the following with reference to the drawings, focusing on differences from the first embodiment. Parts that are the same as the first embodiment are denoted by the same reference numerals, and descriptions thereof are omitted. In the present embodiment, two cooling devices are provided corresponding to the two motor sets.

Figure 9:
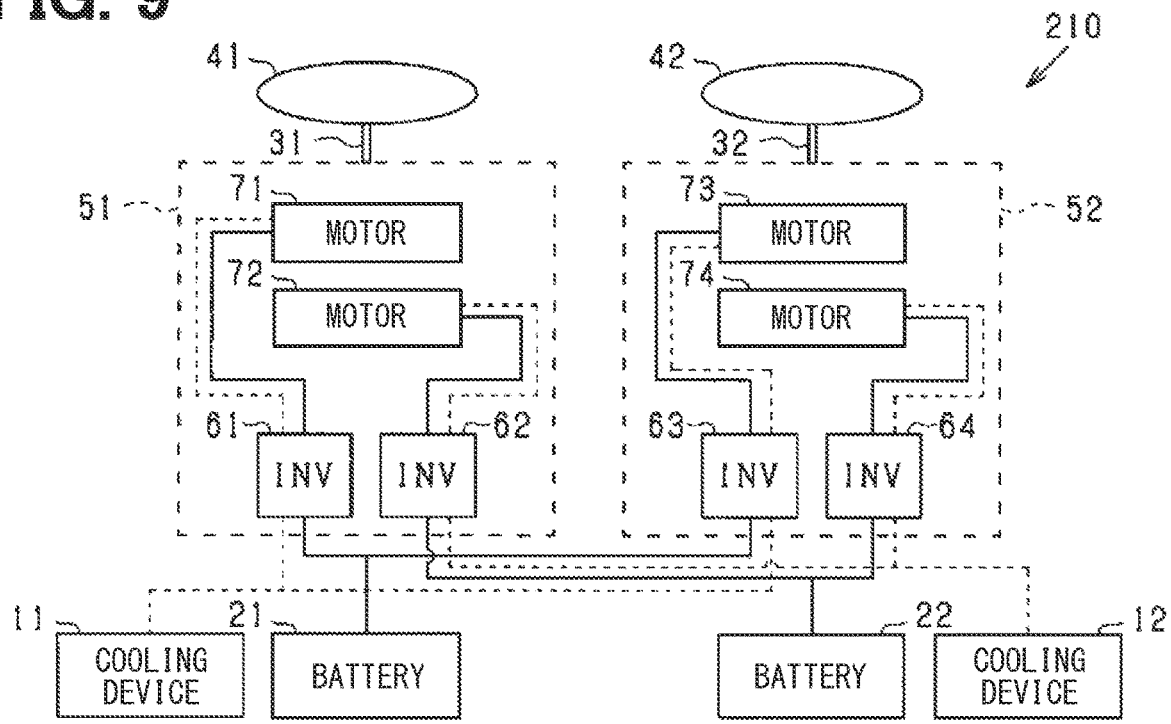
FIG. 9 is a schematic diagram of an electric aircraft according to a third embodiment.

As shown in FIG. 9, in an electric aircraft 210, the propulsion units 51, 52 are supplied with coolant from both of cooling devices 11, 12. The cooling devices 11 and 12 cool the INV units 61 to 64, the motors 71 to 74, and the like by circulating coolant such as water in the propulsion units 51 and 52 to exchange heat. In the drawing, a coolant supply route is indicated by a dashed line.

The INV units 61 and 62 are supplied with coolant from the cooling devices 11 and 12, respectively. The INV unit 61 is supplied with coolant from the cooling device 11 and is not supplied with coolant from the cooling device 12. The INV unit 62 is supplied with coolant from the cooling device 12 and is not supplied with coolant from the cooling device 11. That is, each of the INV units 61, 62 of the propulsion unit 51 is supplied with coolant from separate cooling devices 11, 12, respectively.

The INV units 63 and 64 are supplied with coolant from the cooling devices 11 and 12, respectively. The INV unit 63 is supplied with coolant from the cooling device 11 and is not supplied with coolant from the cooling device 12. The INV unit 64 is supplied with coolant from the cooling device 12 and is not supplied with coolant from the cooling device 11. That is, each of the INV unit 63, 64 of the propulsion unit 52 is supplied with coolant from separate cooling devices 11, 12, respectively.

The motors 71 to 74 (i.e., a plurality of motors) and the cooling devices 11 and 12 (i.e., a plurality of cooling devices) are connected, so that the cooling devices 11, 12 supply coolant to each of a first motor set and a second motor set (each motor set) driving separate output shafts 31, 32 (separate output shafts), in a manner corresponding to the connections between the motors 71 to 74 and the batteries 21 and 22.

In the first control, the first control unit 81 assigns active or standby to the motors 71, 72, 73, 74 (a plurality of motors) driving the output shafts 31, 32 so that each of the output shafts 31 and 32 is driven by the same number of motors, and each of the cooling devices 11 and 12 cools the same number of motors in the drive state. As the first control, similarly to the first embodiment, the first pattern and the second pattern are periodically switched. The first pattern is a pattern in which the motors 71 and 74 are active (i.e., drive state) and the motors 72 and 73 are on standby (i.e., stop state). The second pattern is a pattern in which the motors 72 and 73 are active and the motors 71 and 74 are standby.

In the second control, when the switching control is performed by the switching unit 85, the second control unit 82 assigns active or standby to a motor set including the abnormal motor and to a motor set including the switched motor, so that each of the output shafts is driven by the same number of motors, and each of the cooling devices 11 and 12 cools the same number of the motors in the drive state.

Also in the present embodiment, the integration ECU 80 performs the abnormality determination during the first control shown in FIG. 4 and the abnormality determination during the third control shown in FIG. 6.

The present embodiment described above in detail has the following advantages. Here, only advantages different from those of the first embodiment are described.

The motors 71 to 74 and the cooling devices 11 and 12 are connected so that the cooling devices 11 and 12 supply coolant to each of the first motor set and the second motor set, respectively driving the separate output shafts. Therefore, even when an abnormality occurs in the cooling device that supplies coolant to one motor set, the coolant is supplied from the other cooling device to the other motor set to drive the motors to which the coolant is supplied, thereby the output shafts 31 and 32 can still be driven by the motors while cooling the plural motor sets. Then, the first control unit 81 performs the first control, which assigns the drive state or the stop state (standby) to each of the motors 71 to 74 driving the output shafts, so that each of the output shafts 31 and 32 is driven by the same number of motors, and each of the cooling devices 11, 12 cools the same number of motors in the drive state (active). Therefore, while causing the same number of motors to drive the output shafts 31 and 32, it is possible to prevent the cooling load to be unevenly distributed among the cooling devices.

When the abnormal motor is switched to the stop state and the switched motor is switched to the drive state, the number of motors in the drive state which are cooled by the cooling device supplying coolant thereto changes in the motor set including the abnormal motor and in the motor set including the switched motor. Therefore, there is a possibility that the numbers of motors in the drive state that are cooled by the respective cooling devices 11 and 12 become different from each other, and the cooling load for the respective cooling devices may become uneven. In this respect, when the switching unit 85 performs the switching control, the second control unit 82 performs the second control, which assigns the drive state or the stop state to a motor set including the abnormal motor and to a motor set including the switched motor, so that each of the output shafts 31, 32 is driven by the same number of motors, and each of the cooling devices 11, 12 cools the same number of motors in the drive state. Therefore, even when an abnormality occurs in the motor, it is possible to suppress unevenness in the cooling load of each cooling device.

It should be noted that the third embodiment can also be implemented with the following modifications. Parts that are the same as in the third embodiment are denoted by the same reference numerals, and descriptions thereof are omitted.

Figure 10:
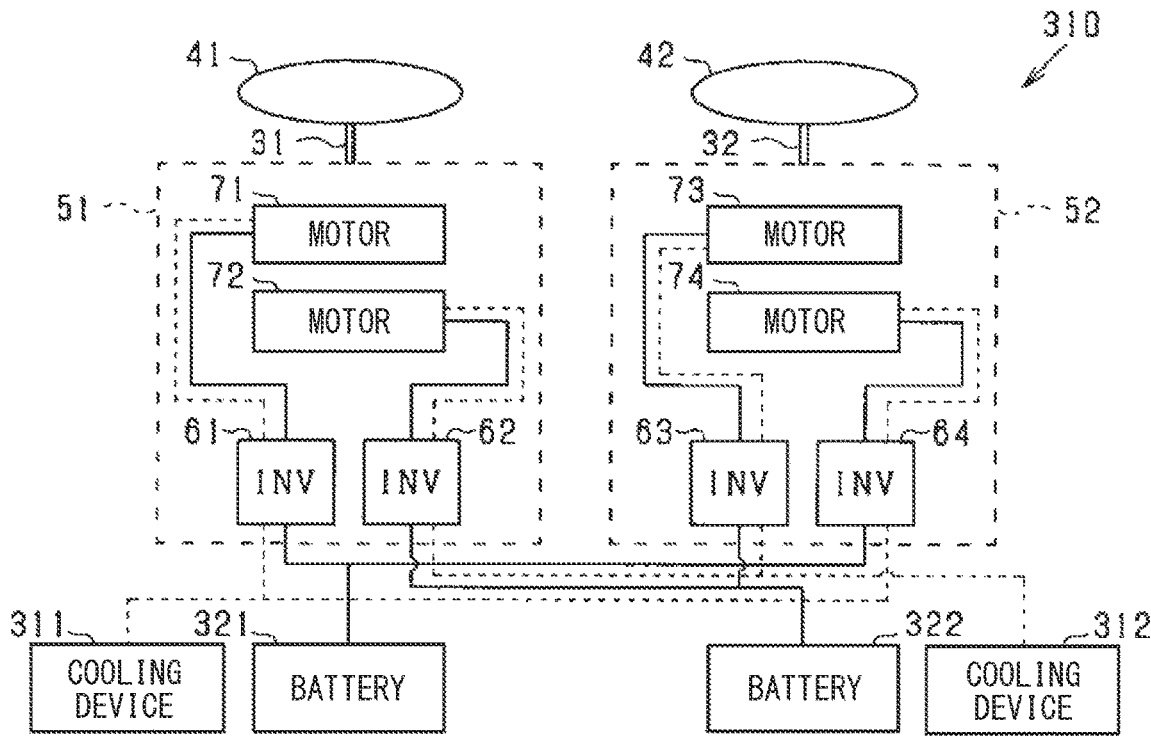
FIG. 10 is a schematic diagram showing a modification of the electric aircraft of the third embodiment.

As shown in FIG. 10, in an electric aircraft 310, it is possible to change the connection between the plurality of batteries and the plurality of systems, and then to change the connection between the plurality of cooling devices and the plurality of systems according to such change. In FIG. 10, a battery 321 is connected to the INV unit 61 and a battery 322 is not connected thereto. The battery 322 is connected to the INV unit 62 and the battery 321 is not connected thereto. That is, separate batteries 321 and 322 are connected to the INV units 61 and 62 of the propulsion unit 51, respectively. Correspondingly, the cooling device 311 is connected to the INV unit 61 and the cooling device 312 is not connected thereto. The cooling device 312 is connected to the INV unit 62 and the cooling device 311 is not connected thereto. That is, separate cooling devices 311 and 312 are connected to the INV units 61 and 62 of the propulsion unit 51, respectively.

The battery 322 is connected to the INV unit 63 and the battery 321 is not connected thereto. The battery 321 is connected to the INV unit 64 and the battery 322 is not connected thereto. That is, separate batteries 322, 321 are connected to the INV units 63, 64 of the propulsion unit 52, respectively. Correspondingly, the cooling device 312 is connected to the INV unit 63 and the cooling device 311 is not connected thereto. The cooling device 311 is connected to the INV unit 64 and the cooling device 312 is not connected thereto. That is, separate cooling devices 312 and 311 are connected to the INV units 63 and 64 of the propulsion unit 52, respectively. Even with the above-described configuration, the same effects as those of the third embodiment are achievable.

Figure 11:
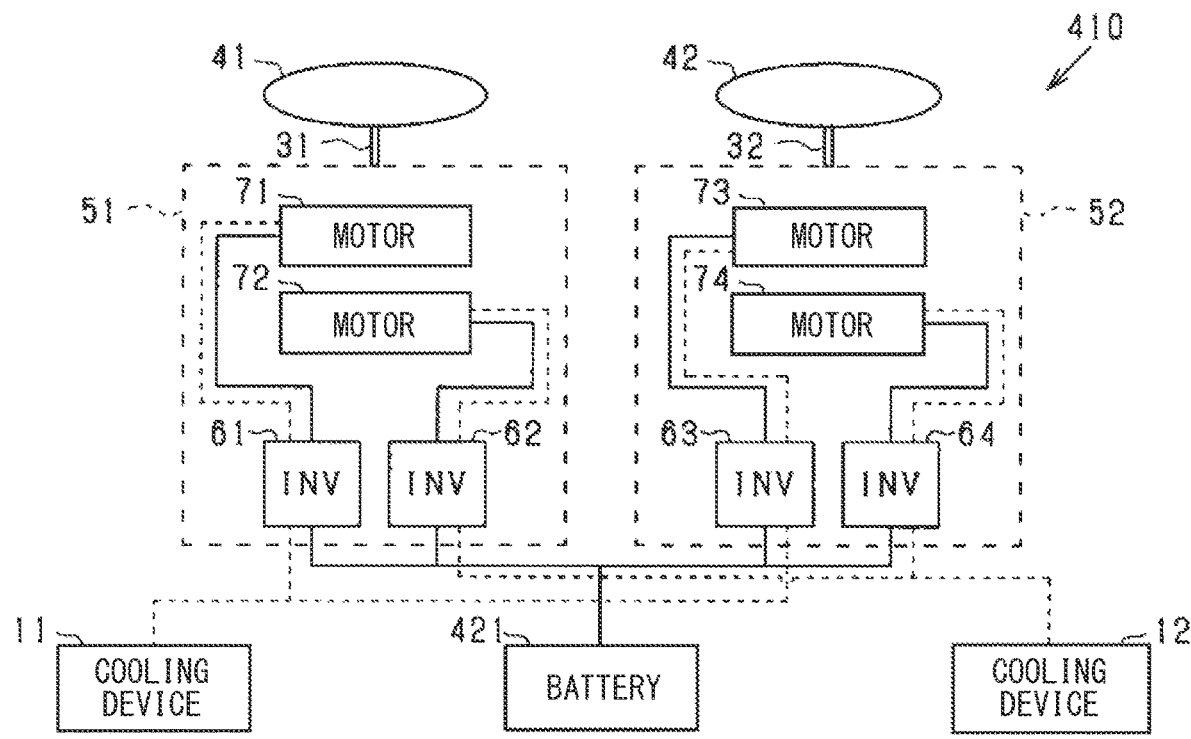
FIG. 11 is a schematic diagram showing another modification of the electric aircraft of the third embodiment.

As shown in FIG. 11, it is also possible to change the connections between the plurality of cooling devices and the plurality of systems irrespective of (independently from) the connections between the plurality of batteries and the plurality of systems. In FIG. 11, a battery 421 is connected to the INV units 61 to 64. That is, the same battery 421 is connected to each of the INV units 61 to 64.

The cooling device 11 is connected to the INV unit 61 and the cooling device 12 is not connected thereto. The cooling device 12 is connected to the INV unit 62 and the cooling device 11 is not connected thereto. That is, separate cooling devices 311 and 312 are connected to the INV units 61 and 62 of the propulsion unit 51, respectively.

The cooling device 11 is connected to the INV unit 63 and the cooling device 12 is not connected thereto. The cooling device 12 is connected to the INV unit 64 and the cooling device 11 is not connected thereto. That is, separate cooling devices 311 and 312 are connected to the INV units 63 and 64 of the propulsion unit 52, respectively.

The first control unit 81 performs the first control, which assigns active or standby to each of the motors 71, 72 and the motors 73, 74 (a plurality of motors) that drive the output shafts 31, 32, so that each of the output shafts 31 and 32 is driven by the same number of motors and each of the cooling devices 11 and 12 cools the same number of motors in the drive state. As the first control, similarly to the first embodiment, the first pattern and the second pattern are periodically switched. The first pattern is a pattern in which the motors 71 and 74 are active (i.e., drive state) and the motors 72 and 73 are on standby (i.e., stop state). The second pattern is a pattern in which the motors 72 and 73 are active and the motors 71 and 74 are standby.

When the switching control is performed by the switching unit 85, the second control unit 82 performs the second control, which assigns active or standby to each of the motor set including the abnormal motor and to each of the motor set including the switched motor, so that each of the output shafts is driven by the same number of the motors and each of the cooling devices 11 and 12 cools the same number of motors in the drive state.

Then, the integration ECU 80 performs the abnormality determination during the first control shown in FIG. 4 and the abnormality determination during the third control shown in FIG. 6, "by cooling the same number of motors in the drive state respectively by the cooling devices 11 and 12" instead of "powering the same number of motors respectively by the batteries 21 and 22." Even with the above-described configuration, when an abnormality occurs in the motor, it is possible to suppress unevenness in the cooling load of each of the cooling devices.

Fourth Embodiment

Hereinafter, the fourth embodiment is described with reference to the drawings, focusing on the differences from the first embodiment. In the present embodiment, a battery is provided for each propulsion unit.

Figure 12:
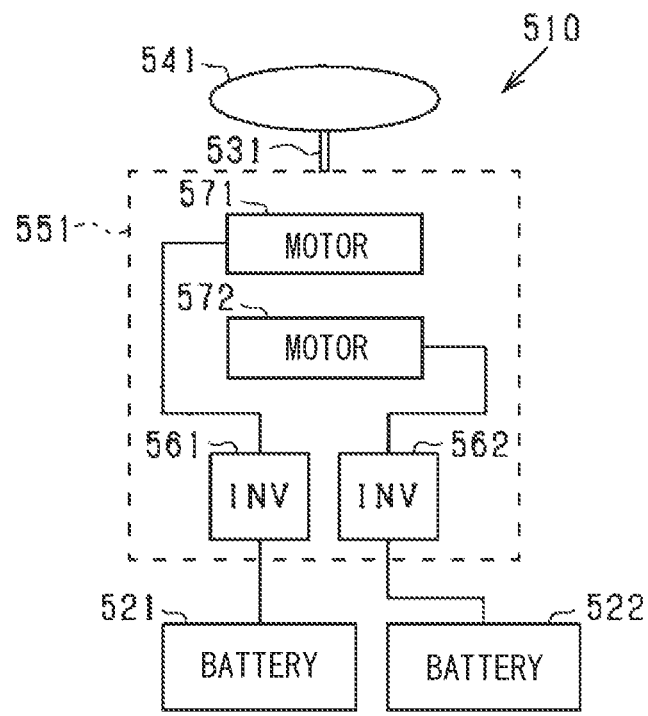
FIG. 12 is a schematic diagram showing a modification of the electric aircraft.

As shown in FIG. 12, an electric aircraft 510 includes batteries 521 and 522, a propulsion unit 551, an output shaft 531, a propeller 541, and the like. The electric aircraft 510 has a plurality of sets of these configurations, but here, one set shown in the drawing is described.

The batteries 521 and 522 are chargeable/dischargeable secondary batteries, and have the same rated voltage and rated capacity.

The propulsion unit 551 receives power supply from both of the batteries 521 and 522 and outputs driving force for propulsion.

The propulsion unit 551 has a configuration similar to that of the propulsion unit 51. The battery 521 is connected to the INV unit 561 and the battery 522 is not connected thereto. The battery 522 is connected to the INV unit 562 and the battery 521 is not connected thereto. That is, separate batteries 521 and 522 are connected to the INV units 561 and 562 of the propulsion unit 551, respectively.

The third control unit 83 (i.e., double drive control unit) performs the third control (i.e., double drive control) that assigns the drive state (active) to a plurality of (at least two) motors 571 and 572 that drive the output shaft 531.

As described above, when the third control is being performed, even when it is determined that one of the drive motors is abnormal based on the rotation speed (i.e., predetermined state quantity), the abnormal drive motor cannot be identified if the rotation speeds of the plurality of drive motors are the same.

Therefore, when the third control (double drive control) is performed by the third control unit 83 (double drive control unit) and it is determined that one of the plurality of motors is abnormal, the single drive control unit 86 performs the single drive control in which the drive state is assigned to only one of the plurality of motors and the stop state is assigned to the other motors.

The switching unit 85 performs the switching control, in which an abnormal motor is switched to standby when the abnormal motor that is determined as abnormal by the abnormality determination unit 84 is active, and a switched motor, which is one of the standby motors that drives the same output shaft driven by the abnormal motor, is switched to active. The switching unit 85 transmits a drive permission instruction and a speed instruction to an INV control unit corresponding to the switched motor, and transmits a stop instruction to an INV control unit corresponding to the abnormal motor.

The abnormality determination unit 84 identifies an abnormal motor having an abnormality based on a predetermined state quantity correlated with the drive state of the drive motor, which is a motor to which the drive state is assigned, when the single drive control is being performed by the single drive control unit 86.

The present embodiment has the following advantages. Here, only advantages different from those of the first embodiment are described.

The double drive control unit (i.e., third control unit 83) performs the double drive control that assigns the drive state to at least two of the plurality of motors 571 and 572.

Therefore, by performing double drive control, the output performance of the electric movable body is improvable more than when only one motor is assigned to the drive state. In particular, the double drive control unit assigns the drive state to all the motors 571 and 572 that drive the output shaft 531 in the double drive control. Therefore, the maximum output performance of the electric aircraft 510 is guaranteeable by performing the double drive control.

The single drive control unit 86 performs the single drive control, which assigns the drive state to only one of the plurality of motors 571 and 572 and assigns the stop state to the other motors, when the double drive control unit performs the double drive control and one of the plurality of motors 571 and 572 is determined as abnormal. Then, the abnormality determination unit 84 identifies an abnormal motor having an abnormality based on the predetermined state quantity correlated with the drive state of the drive motor, when the single drive control unit 86 is performing the single drive control. Therefore, the state in which the drive states of the plurality of motors 571 and 572 affect the predetermined state quantity is changeable to the state in which the drive state of only one motor affects the predetermined state quantity. Therefore, in the electric aircraft 510 including the plurality of motors 571 and 572 that drive the output shaft 531, identification of the abnormal motor is made easy even when the plurality of motors 571 and 572 are in the drive state.

It should be noted that the fourth embodiment can also be implemented with the following modifications. Parts that are the same as the fourth embodiment are denoted by the same reference numerals, and descriptions thereof are omitted.

Figure 13:
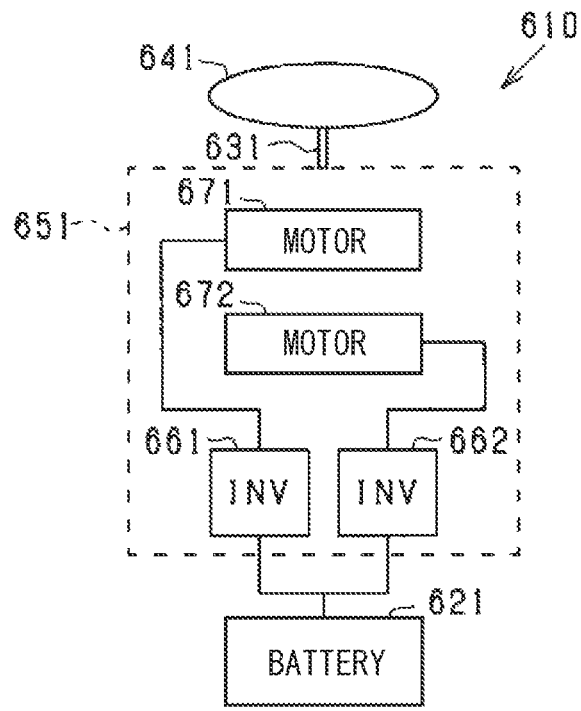
FIG. 13 is a schematic diagram showing another modification of the electric aircraft.

As shown in FIG. 13, an electric aircraft 610 may include a battery 621 instead of the batteries 521 and 522 shown in FIG. 12. A propulsion unit 651 receives supply of electric power from the battery 621, and outputs driving force for propulsion. The propulsion unit 651 has a configuration similar to that of the propulsion unit 51. The battery 621 is connected to the INV units 661 and 662. The same effects as those of the fourth embodiment are achievable with such a configuration as well.

Other Embodiments

It should be noted that the first to fourth embodiments can be modified as follows. Parts that are the same as those in the first to fourth embodiments are denoted by the same reference numerals, and descriptions thereof are omitted.

The single drive control unit 86 assigns the drive state or the stop state to the plurality of motors driving the output shafts, so that, in the single drive control, each of the output shafts is driven by the same number of motors and each of the batteries powers the same number of motors. According to such a configuration, while the number of motors driving the respective output shafts is made equal, it is possible to suppress unevenness in the supply amount of electric power from each of the batteries.

Further, when the switching control is performed by the switching unit 85, the second control unit 82 (i.e., reassignment control unit) performs the second control (i.e., reassignment control), which assigns the drive state or the stop state to each of the motor set including the abnormal motor and to each of the motor set including the switched motor, so that each output shaft is driven by the same number of motors and each battery supplies electric power to the same number of motors. Therefore, even when an abnormality occurs in the motor, it is possible to suppress unevenness in the amount of electric power supplied from each battery.

Further, the single drive control unit 86 assigns the drive state or the stop state to each of the plurality of motors driving the output shafts, so that, in the single drive control, each of the output shafts is driven by the same number of motors and each of the cooling devices cools the same number of motors in the drive state. According to such a configuration, while the number of motors driving the respective output shafts can be made equal to each other, unevenness of the cooling load among the cooling devices can be suppressed.

Then, in the second control (i.e., reassignment control), the second control unit 82 (i.e., reassignment control unit) assigns, when the switching control is performed by the switching unit 85, the drive state or the stop state to each of the motor set including the abnormal motor and to each of the motor set including the switched motor, so that each of the output shafts is driven by the same number of motors and each of the cooling devices cools the same number of motors in the drive state. Therefore, even when an abnormality occurs in the motor, it is possible to suppress unevenness in the cooling load of each cooling device.

Figure 14:
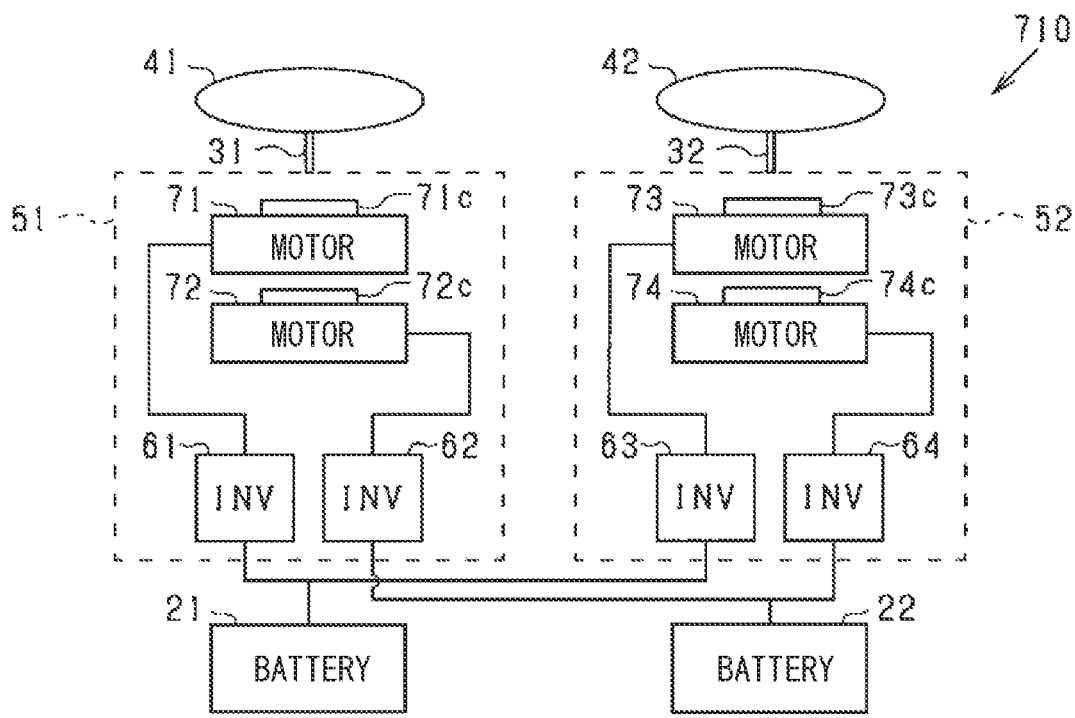
FIG. 14 is a schematic diagram showing yet another modification of the electric aircraft.

As shown in FIG. 14, an electric aircraft 710 may include clutches 71c and 72c that switch between a state in which a torque is transmitted from the motors 71 and 72 to the output shaft 31 and a state in which a torque is not transmitted from the motors 71 and 72 to the output shaft 31, and clutches 73c and 74c that switch between a state in which a torque is transmitted from the motors 73 and 74 to the output shaft 32 and a state in which a torque is not transmitted from the motors 73 and 74 to the output shaft 32. The clutches 71c to 74c are known clutches for connecting and disconnecting between the motors 71 to 74 and the output shafts 31 and 32, respectively.

Further, when the first control (i.e., single drive control) is being performed by the first control unit 81 (i.e., by the single drive control unit 86), the abnormality determination unit 84 determines an abnormality of the stopped motor, which is a motor to which the stop state is assigned, by changing the stopped motor to the drive state after switching the clutch from a torque transmission state to a torque non-transmission state and based on the predetermined state quantity (for example, rotation speed) correlated with the drive state of the stopped motor.

According to the above-described configuration, by switching the clutches 71c to 74c to a state in which torque is not transmitted to the output shaft from the motor to which the stop state is assigned, transmission of braking torque or the like from the motor in the stop state to the output shaft is suppressible. Further, by switching the clutches 71c to 74c to a state in which torque is not transmitted to the output shaft from the stopped motor, it is possible to determine the abnormality of the stopped motor at any timing without changing the output of the output shaft. Therefore, it is possible to quickly determine the abnormality of the motor including not only the drive motor but also the stopped motor.

Note that when changing the stopped motor to the drive state, a plurality of stopped motors may also be changed to the drive state at the same time. Further, when changing the stopped motor to the drive state, the stopped motor may either be rotated forward or backward.

Figure 15:
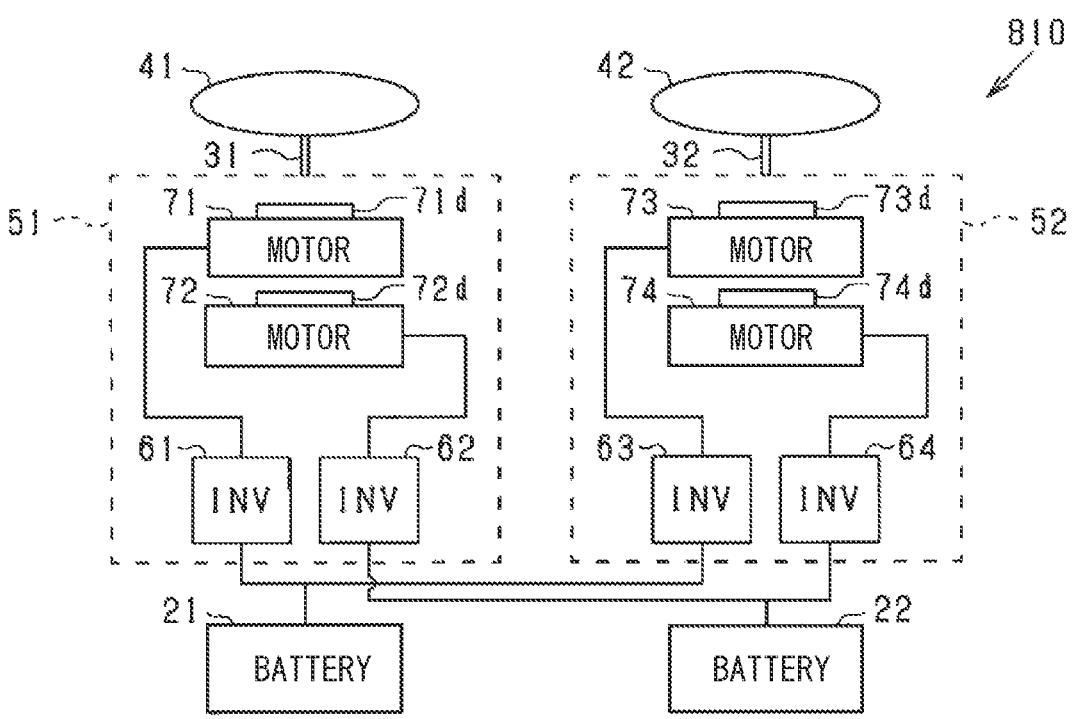
FIG. 15 is a schematic diagram showing still yet another modification of the electric aircraft.

As shown in FIG. 15, an electric aircraft 810 may have one-way clutches 71d, 72d, 73d and 74d, among which the one-way clutches 71d, 72d permit transmission of a torque from the motors 71, 72 to the output shaft 31 and prohibit transmission of a torque from the output shaft 31 to the motors 71, 72, and the one-way clutches 73d, 74d permit transmission of a torque from the motors 73, 74 to the output shaft 32 and prohibit transmission of a torque from the output shaft 32 to the motors 73, 74, respectively.

Then, when the first control (i.e., single drive control) is being performed by the first control unit 81 (i.e., by the single drive control unit 86), the abnormality determination unit 84 determines an abnormality of the stopped motor based on the predetermined state quantity (for example, rotation speed) of the stopped motor, by changing the stopped motor to be put in the drive state for rotating the stopped motor in an opposite direction opposite to a rotation direction of the drive motor to which the drive state is assigned.

According to the above-described configuration, when the motors 71, 72 and the motors 73, 74 are in the drive state, the one-way clutches 71d, 72d and the one-way clutches 73d, 74d switch to a state in which a torque is transmissible from the motors 71, 72 to the output shaft 31 and from the motors 73, 74 to the output shaft 32. Further, when the motors 71, 72 and the motors 73m 74 are in the stop state or in the drive state with an opposite rotation direction, the one-way clutches 71d, 72d and the one-way clutches 73d, 74d switch to a state which does not transmit a torque from the output shafts 31, 32 to the motors 71, 72 and the motors 73, 74, i.e., to a state which does not transmit a negative torque from the motors 71, 72 and the motors 73, 74 to the output shafts 31, 32. Therefore, even without controlling the clutches, the one-way clutches 71d to 74d can be switched to a state in which a torque is not transmitted from the motor to which the stop state is assigned to the output shaft, thereby preventing the braking torque and the like from being transmitted from the motor in the stop state to the output shaft.

Further, when the first control (i.e., single drive control) is being performed by the first control unit 81 (i.e., by the single drive control unit 86), the abnormality determination unit 84 determines an abnormality of the stopped motor based on the predetermined state quantity of the stopped motor, by changing the stopped motor to the drive state in which the stopped motor is driven in the opposite rotation direction opposite to the rotation direction of the drive motor to which the drive state is assigned. Therefore, when the stopped motor is changed to the drive state in which the rotation direction of the motor is opposite to that of the drive motor, the one-way clutch can switch to a state in which the braking torque or the like is not transmitted from the stopped motor to the output shaft, thereby abnormality of the stopped motor is determinable at any timing without changing the output of the output shaft Note that, when the stopped motor is changed to the opposite rotation direction in the drive state, a plurality of stopped motors may be changed to the opposite rotation direction in the drive state at the same time.

Further, the electric disconnection mechanism (91 to 93) shown in FIG. 3 and the clutches 71c to 74c shown in FIG. 14 or the one-way clutches 71d to 74d shown in FIG. 15 may be provided in the electric aircraft. According to such a configuration, transmission of the braking torque from the stopped motor to the output shafts 31, 32 can be doubly suppressed by the clutches 71c to 74c or the one-way clutches 71d to 74d and the electric disconnection mechanism.

The time to change the stopped motor to the opposite rotation direction in the drive state and to determine the abnormality of the stopped motor may be set to a time when the electric aircraft is coasting or a time when the propeller is stopped before the electric aircraft takes off. That is, even when the speed instruction of speed zero is being used, it is possible to determine an abnormality of the stopped motor.

Figure 16:
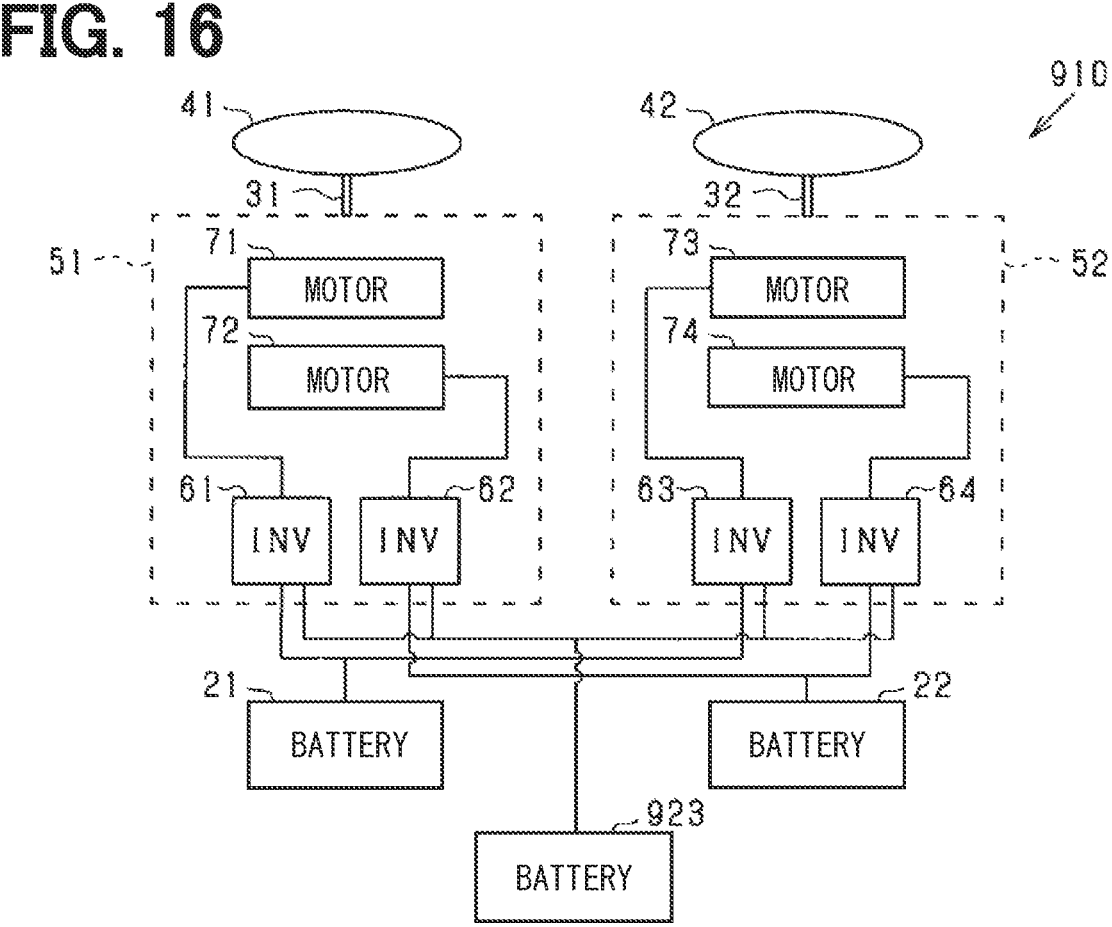
FIG. 16 is a schematic diagram showing still yet another modification of the electric aircraft.

As shown in FIG. 16, an electric aircraft 910 may include a battery 923 that powers the INV units 61 to 64. That is, electric power may be supplied from a plurality of batteries to one system. According to such a configuration, even when an abnormality occurs in one of the batteries 21 and 22, electric power is suppliable from the battery 923 to the INV unit that has been powered by the battery in which the abnormality has occurred. Therefore, even when an abnormality occurs either in the battery 21 or 22, the maximum output performance of the electric aircraft 910 is still guaranteeable.

When the first control (i.e., single drive control) is being performed by the first control unit 81 (i.e., by the single drive control unit 86), the stopped motor to which the stop state is assigned among the plurality of motors that drive the same output shaft may be driven with a constant torque smaller than the output torque of the drive motor, which is the motor to which the drive state is assigned. According to such a configuration, when the first control (i.e., single drive control) is being performed, by driving the stopped motor with a constant torque (e.g., a torque of 0 or more) smaller than the output torque of the drive motor, transmission of the braking torque from the stopped motor to the output shaft is suppressible. Therefore, even when the electric movable body does not have a clutch that switches between a first state in which a torque is transmitted from each motor to each output shaft and a second state in which a torque is not transmitted, transmission of the braking torque from the stopped motor to the output shaft is suppressible.

When temperature of a magnet (e.g., the magnet 71a) of each motor (e.g., the motor 71) is lower than a predetermined temperature (e.g., $-20°$ C.), the output of each motor may drop to be lower than the reference output. Therefore, among the plurality of motors that drive the same output shaft, when the stopped motor, which is a motor to which the stop state is assigned, is not determined as abnormal, and temperature of the magnet of the stopped motor is lower than a predetermined temperature, the stopped motor may be driven with a constant torque smaller than the output torque of the drive motor, which is a motor to which the drive state is assigned. According to such a configuration, temperature of the magnet of the stopped motor can be increased compared to a case where the stopped motor is maintained in the stop state, and the output of the stopped motor dropping to be lower than the reference output is preventable when the stopped motor is driven.

The number of systems including the INV unit and the motor may be four or more for one output shaft. Moreover, the number of output shafts is also arbitrary.

The rotation speed of the output shaft driven by the drive motor, the motor torque output by the drive motor, the output shaft torque output by the output shaft driven by the drive motor may be adoptable as the predetermined state quantity correlated with the drive state of the drive motor together with other quantity. In such case, instead of using the speed monitoring unit 61c, a predetermined state quantity monitoring unit may monitor whether the predetermined state quantity is out of a predetermined threshold range. Further, when a plurality of motors are directly connected to the output shaft, the rotation speed of the drive motor and the rotation speed of the stopped motor are the same, thereby the rotation speed of the stopped motor can be used as the predetermined state quantity.

The INV control unit (i.e., INV unit) may be provided with the first control unit 81 to the third control unit 83, the abnormality determination unit 84, the switching unit 85, and the single drive control unit 86 instead of the integrated ECU 80.

As each of the motors, not only an AC motor but also a DC motor is adoptable. In such case, instead of using the INV unit, a current control unit or the like that controls an electric current flowing through the DC motor is adoptable.

Each of the motors can be changed to a motor generator capable of driving and generating electric power. Further, the control in each of the first to fourth embodiments can be performed by replacing the driving of each of the motors with an electric power generation by each of the motors. According to such a configuration, even when an abnormality occurs in the motor generator, it is possible to suppress unevenness in a received power amount (i.e., charge amount) for each of the batteries.

Each of the above-described embodiments can be applied not only to an electric aircraft, but also to electrically-driven train (i.e., electric movable body) and electric watercraft (i.e., electric movable body). In such case, the electric movable body may be provided with driving wheels instead of the propeller, and the electric watercraft may be provided with a screw instead of the propeller.

Although the present disclosure has been described in accordance with the embodiments, it is understood that the present disclosure is not limited to the above embodiments or structures. The present disclosure incorporates various modifications and variations within the scope of equivalents. In addition, the present disclosure also includes various combinations and configurations, as well as other combinations and configurations that include only one element added thereto or subtracted therefrom, within the scope and spirit of the present disclosure.

What is claimed is:

1. An electric movable body comprising:
   an output shaft;
   a double drive control unit configured to perform a double drive control to assign a drive state to at least two motors configured to drive the output shaft;
   a single drive control unit configured to, when the double drive control unit performs the double drive control, and on determination that one of the at least two motors is abnormal, perform a single drive control to assign the drive state to only one of the at least two motors and assign a stop state to all other motors configured to drive the output shaft; and
   an abnormality determination unit configured to, when the single drive control unit performs the single drive control, identify a drive motor, to which the drive state is assigned and which is abnormal, based on a predetermined state quantity correlated with the drive state of the drive motor.

2. The electric movable body according to claim 1, wherein
   the single drive control unit is configured to, when the abnormality determination unit cannot identify the drive motor that is abnormal:
   assign the drive state to only another one of the at least two motors, which is other than the one motor to which the drive state is assigned in the single drive control at a previous time or before;
   assign the stop state to all other motors configured to drive the output shaft; and
   perform the single drive control again.

3. The electric movable body according to claim 1, wherein
   when the abnormality determination unit identifies the drive motor that is abnormal, and when the at least two motors include a motor that is normal, the drive motor that is identified to be abnormal is switched into the stop state, and the motor that is normal is switched into the drive state.

4. The electric movable body according to claim 1, further comprising:
   a clutch configured to switch between a first state, in which a torque is transmitted from the at least two motors to the output shaft, and a second state in which the torque is not transmittable, wherein
   the abnormality determination unit is configured to, when the single drive control unit performs the single drive control:
   cause the clutch to switch into the second state, in which the torque is not transmittable from a stopped motor, to which the stop state is assigned, to the output shaft;
   change the stopped motor into the drive state, and
   determine an abnormality of the stopped motor based on the predetermined state quantity correlated with the drive state of the stopped motor.

5. The electric movable body according to claim 4, wherein
   the clutch is a one-way clutch configured to permit transmission of the torque from the at least two motors to the output shaft and prohibit transmission of a torque from the output shaft to the at least two motors, and
   the abnormality determination unit is configured to, when the single drive control unit performs the single drive control,
   change the stopped motor into a drive state in which a rotation direction is opposite to a rotation direction of the drive motor to which the drive state is assigned, and
   determine an abnormality of the stopped motor based on the predetermined state quantity of the stopped motor.

6. The electric movable body according to claim 1, further comprising:
   a battery configured to supply electric power to the at least two motors; and
   an electric disconnection mechanism configured to electrically disconnect between the at least two motors and the battery, wherein
   the electric disconnection mechanism is configured to, when the single drive control unit performs the single drive control, electrically disconnect between a stopped motor, to which the stop state is assigned, and the battery.

7. The electric movable body according to claim 1, wherein
   when the single drive control unit performs the single drive control, a stopped motor, to which the stop state is assigned among the at least two motors, is driven with a constant torque that is smaller than an output torque of the drive motor, to which the drive state is assigned.

8. The electric movable body according to claim 1, wherein
   when a stopped motor, to which the stop state is assigned among the at least two motors, is not determined to be abnormal, and when temperature of a magnet of the stopped motor is lower than a predetermined temperature, the stopped motor is driven with a constant torque, which is smaller than an output torque of the drive motor to which the drive state is assigned.

9. The electric movable body according to claim 1, further comprising:
a plurality of output shafts including the output shaft, the at least two motors being configured to drive the output shafts; and
a plurality of batteries, wherein
the at least two motors and the batteries are connected to each other such that each of the batteries is configured to supply electric power to a motor set of a plurality of motors sets each configured to drive one of the output shafts, and
the single drive control unit is configured to, in the single drive control, assign either the drive state or the stop state to each of the at least two motors, such that each of the output shafts is driven by a same number of the motors and such that each of the batteries supplies electric power to a same number of the motors, and
the electric movable body further comprises:
a switching unit configured to, when an abnormal motor determined by the abnormality determination unit is in the drive state, perform a switching control to switch the abnormal motor into the stop state and to switch one of a plurality of switched motors, which is in the stop state and configured to drive the corresponding output shaft driven by the abnormal motor, into the drive state; and
a reassignment control unit configured to, when the switching unit performs the switching control, perform a reassignment control to assign either the drive state or the stop state to one of the motors, which constitutes the motor set including the abnormal motor, and to one of the motors, which constitutes the motor set including the switched motor, such that each of the output shafts is driven by a same number of the motors, and such that each of the batteries supplies electric power to a same number of the motors.

10. The electric movable body according to claim 9, further comprising:
a plurality of cooling devices, wherein
the at least two motors and the cooling devices are connected to each other so as to correspond to connections between the motors and the batteries such that each of the cooling devices is configured to supply coolant to the motor sets each configured to drive one of the output shafts,
the single drive control unit is configured to assign, in the single drive control, either the drive state or the stop state to each of the at least two motors such that each of the output shafts is driven by a same number of the motors and such that each of the cooling devices cools a same number of the motors in the drive state, and
the reassignment control unit is configured to, when the switching unit performs the switching control, assign, in the reassignment control, either the drive state or the stop state to the motor set, which includes the abnormal motor, and to the motor set, which includes the switched motor, such that each of the output shafts is driven by a same number of the motors and such that each of the cooling devices cools a same number of the motors in the drive state.

11. An electric movable body comprising:
an output shaft; and
a processor configured to
perform a double drive control to assign a drive state to at least two motors configured to drive the output shaft,
perform a single drive control to assign the drive state to only one of the at least two motors and assign a stop state to all other motors configured to drive the output shaft, when performing the double drive control, and on determination that one of the motors is abnormal, and
identify a drive motor, to which the drive state is assigned and which is abnormal, based on a predetermined state quantity correlated with the drive state of the drive motor, when performing the single drive control.

12. The electric movable body according to claim 1, wherein
a number of the at least two motors is two.

13. The electric movable body according to claim 11, wherein
a number of the at least two motors is two.

* * * * *